| United States Patent [19] | [11] Patent Number: 4,970,278 |
| Komabashiri et al. | [45] Date of Patent: Nov. 13, 1990 |

[54] METHOD OF PREVENTING POLYMER SCALE DEPOSITION

[75] Inventors: Takamichi Komabashiri; Masahiro Tsujinaka; Toragoro Mitani, all of Takasago, Japan

[73] Assignee: Kanegafuchi Chemical Industry Co., Ltd., Osaka, Japan

[21] Appl. No.: 270,997

[22] Filed: Nov. 14, 1988

[30] Foreign Application Priority Data

Nov. 19, 1987 [JP] Japan .................. 62-293712

[51] Int. Cl.$^5$ .............................................. C08F 2/00
[52] U.S. Cl. ...................................... 526/62; 526/194; 427/230; 427/384
[58] Field of Search ...................... 526/62, 344.2, 194, 526/74, 220; 427/230, 384

[56] References Cited

U.S. PATENT DOCUMENTS 4,517,344 5/1985 Mitani et al. ........................... 526/62
4,539,230 9/1985 Shimizu et al. .................. 526/62 X

FOREIGN PATENT DOCUMENTS 0210104 1/1987 European Pat. Off. .............. 526/62
0047002 3/1985 Japan ..................................... 526/62
61-7309 1/1986 Japan ..................................... 526/62

Primary Examiner—Joseph L. Schofer
Assistant Examiner—F. M. Teskin
Attorney, Agent, or Firm—Jordan and Hamburg

[57] ABSTRACT

Polymer scale deposition on polymerization reactor inside surfaces in the polymerization of a monomer or monomers having an ethylenic double bond and/or a monomer or monomers having diolefinic double bonds is prevented, peelability or removability of polymer scales deposited on such surface, if any, is improved and the scale inhibitor adherence to the wall surface of glass-lined polymerization reactors is improved by coating the inside surfaces of the reactor in advance with a coating composition comprising a quinone-amine compound having a molecular weight of at least 3,000 as obtained by subjecting at least one aromatic diamine and at least one aromatic quinone to addition reaction in at least one solvent having a solubility parameter of 8.5 to 24.0 and/or a reduced form of said quinone-amine compound and at least one silica organosol or a mixture of at least one silica organosol and at least one alkyl silicate to thereby form a hydrophilic coat film on the surfaces.

11 Claims, No Drawings

METHOD OF PREVENTING POLYMER SCALE DEPOSITION

BACKGROUND OF THE INVENTION

This invention relates to a method of preventing polymer scale deposition on polymerization reactor inside surfaces, such as the inside wall of the polymerization reactor, the agitator or impeller shaft and blades, the baffle plates, the temperature measuring device and so forth, in the polymerization of a monomer or monomers having an ethylenic double bond and/or a monomer or monomers having diolefinic double bonds and, at the same time, improving the peelability or removability of a polymer scale deposited on such surface, if any. It further relates to a method of improving the scale inhibitor (scale deposition preventing agent) adherence to the wall surface of glass-lined polymerization reactors.

Emulsion polymerization, suspension polymerization, bulk polymerization, solution polymerization and vapor-phase polymerization techniques are known for the polymerization of one or more monomers having an ethylenic double bond and/or one or more monomers having diolefinic double bonds. In each case, however, polymer scale deposition causes various disadvantages, such as a decrease in heat transfer efficiency, a decrease in product yield, a decrease in product quality due to contamination with scale fragments, an increase in labor required for scale removal and cleaning, and a decrease in time efficiency.

So far a number of attempts have been made to prevent such polymer scale deposition. Thus, for instance, a method known for the suspension polymerization of a halogenated vinyl monomer, such as vinyl chloride, or a monomer mixture consisting of such monomer and a minor amount of a monomer or monomers copolymerizable therewith comprises coating polymerization reactor inside surfaces in advance with a polar compound, such as a quinone compound, an amine compound, a quinone-amine compound, a ketone compound, an aldehyde compound or the like to form a coat film thereon.

However, the effect of such polar compound cannot last long. In particular, when an acrylic or methacrylic ester monomer is a main component of the monomer mixture to be polymerized, the effect of the polar compound as scale inhibitor will disadvantageously decrease markedly, in extreme cases almost to nil, during polymerization.

A presumable reason is that acrylic and methacrylic ester monomers have a very high degree of dissolving power as compared with halogenated vinyl monomers. Thus, monomer mixtures the main component of which is an acrylic or methacrylic ester monomer dissolve partly or wholly those coat films formed by conventional scale inhibitors for the polymerization of halogenated vinyl monomers. As a result, their polymer scale deposition preventing effect is reduced markedly and, in addition, the scale inhibitor dissolved contaminates the product polymer and may cause discoloration of the same. The dissolving power of acrylic and methacrylic ester monomers is still greater than that of aromatic monomers such as styrene and α-methylstyrene.

Although the dissolving power of acrylic and methacrylic esters decreases in the presence of a halogenated vinyl monomer, which is a poor solvent for quinone-amine compounds, the presence of 60% (by weight; hereinafter the same shall apply) or more of an acrylic or methacrylic ester monomer in the monomer mixture allows almost complete dissolution of the prior art scale inhibitors, hence makes it impossible to achieve a scale deposition preventing effect.

The prior art scale inhibitors thus cannot be used in the polymerization of monomer mixtures containing 60% or more of an acrylic ester monomer and/or a methacrylic ester monomer. However, in most of the commercial cases in which an acrylic ester monomer and/or a methacrylic ester monomer is subjected to polymerization, the monomer mixtures contain 60% or more of such monomer. It is therefore very important from the industrial viewpoint to develop a scale inhibitor which is effective also in such a polymerization system.

The present inventors have already proposed a method of polymerizing acrylic and methacrylic esters which comprises, for the purpose of preventing such polymer scale deposition, coating polymerization reactor inside surfaces, such as the inside wall of said reactor, the agitator, the baffle-plates and so forth, in advance with a solution in an organic solvent of a quinone-amine compound having a molecular weight of at least 3,000 as obtained by subjecting an aromatic diamine and an aromatic quinone to addition reaction in a solvent, or a mixture of solvents, having a solubility parameter of 9.0 to 12.2 (hereinafter such quinone-amine compound is briefly referred to as "quinone-amine compound") and/or a reduced form of said quinone-amine compound to form a coat film (Japanese Laid-open Patent Publication No. 61-7309).

However, this class of quinone-amine compounds is not fully satisfactory, for the scale deposition preventing effect is not satisfactory in certain polymerization systems, for example in polymerization systems for producing polyacrylates or polymethacrylates in which an acrylic or methacrylic ester or an acrylic and/or methacrylic ester mixture is the only polymerizable component in the monomer composition to be submitted to polymerization. Scales which have once deposited are firm and solid and are very difficult to remove.

The present inventors made intensive investigations in an attempt to increase the scale preventing effect without encountering such disadvantages or difficulties and, as a result, found that a hydrophilic coat film formed on reactor inside surfaces by coating these with a coating composition comprising a quinone-amine compound having an average molecular weight of at least 3,000 as obtained by subjecting an aromatic diamine and an aromatic quinone to addition reaction in a solvent, or a solvent mixture, having a solubility parameter of 8.5 to 24.0 and/or a reduced form of said quinone-amine compound and a silica organosol and then removing the organic solvent and the like by drying can produce a remarkable scale deposition inhibiting effect even in those polyacrylate and polymethacrylate-producing polymerization systems for which the above compound, when used alone, has no satisfactory scale preventing effect. It was also found that even if scales have deposited, they have good removability or peelability. Based on these findings, the present invention in its first aspect has been completed.

Meanwhile, in the polymerization for producing acrylonitrile-butadiene-styrene copolymers (ABS), butadiene-styrene copolymers (SBR), acrylic ester-methacrylic ester-butadiene-styrene copolymers (MBS) and the like, glass-lined polymerization reactors are generally used because scales are formed in large quantities and the scales are rich in adhesiveness and therefore difficult to remove.

When such glass-lined polymerization reactors are new, scales can deposit only in small amounts and scale removal is easy. When they are old and show an uneven glass lining surface, however, scales can deposit in large amounts and scale removal becomes difficult.

The prior art scale inhibitors and the quinone-amine compounds previously proposed by the present inventors have insufficient adhesiveness to glass-lined polymerization reactors although their adhesiveness to stainless steel polymerization reactors is sufficient from the practical point of view.

Conceivable as methods of causing such scale inhibitors to adhere to the glass lining surface are the method comprising using an organic-to-inorganic coupling agent, the method comprising providing an undercoat of a resin, such as a fluororesin or a silicone, and the method comprising coating with such a resin admixed with a scale inhibitor. However, each method has its drawback; while the adhesiveness of the scale inhibitor to the glass lining surface can be increased, the scale preventing effect is reduced markedly or, in extreme cases, almost no scale preventing effect can be produced.

The present inventors made intensive investigations in an attempt to increase the adhesiveness of scale inhibitors to the glass lining surface without encountering such disadvantages or difficulties and, as a result, found that a hydrophilic coat film formed on the glass lining surface by coating said surface with a coating composition comprising a quinone-amine compound having an average molecular weight of at least 3,000 as obtained by subjecting an aromatic diamine and an aromatic quinone to addition reaction in a solvent, or a solvent mixture, having a solubility parameter of 8.5 to 24.0 and/or a reduced form of said quinone-amine compound, a silica organosol and an alkyl silicate and then removing the organic solvent and the like by drying can have good adhesiveness to the glass lining surface, produce an improved scale preventing effect and render scales, if any, readily removable. Based on these findings, the present invention in its second aspect has been completed.

SUMMARY OF THE INVENTION

In accordance with one aspect of the invention, there is provided a method of preventing polymer scale deposition in the polymerization of at least one monomer having an ethylenic double bond and/or at least one monomer having diolefinic double bonds which comprises coating polymerization reactor inside surfaces, such as the inside wall of said reactor, the agitator shaft and blades, the baffle-plates, the temperature measuring device and so forth, in advance with a coating composition comprising a quinone-amine compound having an average molecular weight of at least 3,000 as obtained by subjecting at least one aromatic diamine and at least one aromatic quinone to addition reaction in at least one solvent having a solubility parameter of 8.5 to 24.0 and/or a reduced form of said quinone-amine compound and at least one silica organosol to thereby form a hydrophilic coat film on said surfaces.

In accordance with another aspect of the invention, there is provided a method of preventing polymer scale deposition in the polymerization of at least one monomer having an ethylenic double bond and/or at least one monomer having diolefinic double bonds which comprises coating polymerization reactor inside surfaces, such as the inside wall of said reactor, the agitator shaft and blades, the baffle plates, the temperature measuring device and so forth, in advance with a coating composition comprising a quinone-amine compound having an average molecular weight of at least 3,000 as obtained by subjecting at least one aromatic diamine and at least one aromatic quinone to addition reaction in at least one solvent having a solubility parameter of 8.5 to 24.0 and/or a reduced form of said quinone-amine compound, and a mixture of at least one silica organosol and at least one alkyl silicate, to thereby form a hydrophilic coat film on said surfaces.

In accordance with the above-mentioned first and second aspects of the invention, polymer scale deposition on those portions which come into contact with monomers, such as the inside wall of the polymerization reactor, the agitator shaft and blades, the baffle plates and the temperature measuring device, can be reduced remarkably and the peelability or removability of the scales that have deposited can be increased markedly. These effects can be produced irrespective of the method of polymerization, the monomer species, the polymerization system composition and other factors.

In accordance with the second aspect of the invention, a firm and uniform film, which has been considered difficult to form on the glass lining surface, can be formed even on the glass-lined polymerization reactor surface without reducing the effects that are producible in accordance with the first aspect of the invention. The life of aged glass-lined polymerization reactors can thus be prolonged. It is also an advantage from the industrial viewpoint that a firm and uniform film can be formed on the stainless steel polymerization reactor surface as well.

In accordance with either of the first and the second aspect of the invention, scale deposition on the polymerization reactor inside wall and so forth can be prevented almost completely even in polymerization systems in which an acrylic or methacrylic ester monomer or an acrylic and/or methacrylic ester monomer mixture accounts for 60% or more of all monomers present in the polymerization reactor, in particular in polyacrylate- or polymethacrylate-producing polymerization systems in which the above monomer or monomer mixture accounts for 100% of the whole monomer composition. The scale preventing effect can be still maintained after 300 batches of polymerization or more.

The reason why polymer scale deposition can be prevented to a remarkable extent in accordance with the first and the second aspect of the invention is presumably that hydrophilic —OH groups occurring on the colloidal silica surface provide the coat film with hydrophilic property, which the quinone-amine compound alone can give only to an insufficient extent, and with the same surface electric charge as that of oily monomer drops and polymer particles to thereby markedly improve the ion repulsing property of said coat film. It is presumable that the improvement in hydrophilic property can result in improved wettability of the wall surface with water, whereby a water film layer can be formed and inhibit not only the polymerization of monomers on the wall surface but also the approach of polymers thereto. It is also presumable that the improvement in ion repulsing property can lead to improvement in the ability to prevent polymer particles and oily monomer drops from approaching the wall surface, hence to the production of excellent scale preventing effect.

Furthermore, in accordance with the second aspect of the invention, the alkyl silicate added to a solution of the compound obtained by condensation of an aromatic diamine and an aromatic quinone and/or a reduced form of said compound in admixture with the silica organosol, preferably an alcoholic silica sol, presumably exists on the silica particle surface in an organic solvent, preferably an alcoholic solvent, and serves to improve the bonding among silica particles, the quinone-amine compound and the glass lining.

The coat film to serve in accordance with the first and the second aspect of the invention can be formed by subjecting an aromatic diamine and an aromatic quinone to addition reaction in a solvent, or a mixture of solvents, having a solubility parameter of 8.5 to 24.0, if necessary in the presence of an oxidizing agent or by means of anodic oxidation using electrodes, for polymer formation, mixing a solution of the thus-obtained quinone-diamine compound having an average molecular weight of at least 3,000 and/or a reduced form of said compound with a silica organosol (in accordance with the first aspect of the invention) or with a mixture of a silica organosol and an alkyl silicate (in accordance with the second aspect of the invention), coating the inside wall of the polymerization reactor and other surfaces with the resulting mixture composition and drying such surfaces for removing the organic solvent, such as an alcohol.

As the aromatic diamine to be used in the practice of the invention in the first and the second aspect thereof, there may be mentioned, for example, p-phenylenediamine, o-phenylenediamine, m-phenylenediamine, 1,4-diaminonaphthalene, 1,8-diaminonaphthalene, diaminoacridine, diaminopyridine, diaminopyrimidine, diaminofluorene, diaminoazobenzene, diaminobenzidine, diaminodiphenylamine, diaminotoluene, and those derivatives of these which have, on the ring structure thereof, at least one substituent selected from the group consisting of an alkyl group, an aryl group, an alkoxy group, a halogen atom, a hydroxyl group, a mercapto group, a nitro group and so forth. Among them, those diamines which have a benzene or naphthalene ring structure are desirable from the reactivity viewpoint. In cases where a diamine having a benzene ring structure is used, however, care should be used since, irrespective of the kind of aromatic quinone, the product quinone-amine compound might have carcinogenicity.

As examples of the aromatic quinone, there may be mentioned p-benzoquinone, o-benzoquinone, $\alpha$-naphthoquinone, $\beta$-naphthoquinone, phenanthraquinone and the like. Those derivatives of these which have, on the aromatic ring structure thereof, at least one substituent selected from the group consisting of a chlorine atom, a bromine atom, a methyl group, an amino group, an alkoxy group and a hydroxyl group can also be employed.

The above-mentioned aromatic diamine and aromatic quinone can be condensation-polymerized by subjecting the aromatic quinone and aromatic diamine to addition reaction in a solvent, or a mixture of solvents, having a solubility parameter of 8.5 to 24.0 and then performing the polymer formation reaction. This polymer formation reaction can be promoted by the presence of an oxidizing agent or by anodic oxidation using electrodes.

The solvent to be used in the production of the quinone-amine compound plays an important role in adjusting the molecular weight of the quinone-amine compound. It is also important from the reaction rate and yield viewpoints, among others. The solvent to be used for such purposes has a solubility parameter (hereinafter referred to as "SP") value of 8.5 to 24.0 and desirably has a dielectric constant of at least 7.

Specific examples of the solvent are tetrahydrofuran (SP value: 9.32; dielectric constant: 7.58; hereinafter referred to as "THF"), dimethylformamide (SP value: 12.0; dielectric constant: 36.71; hereinafter referred to as "DMF"), dimethylacetamide (SP value: 11.0; dielectric constant: 37.8; hereinafter referred to as "DMAc"), acetonitrile (SP value: 11.9; dielectric constant: 37.5), acetone (SP value: 9.71; dielectric constant: 21.45), methyl ethyl ketone (SP value: 9.04; dielectric constant: 15.45), diethyl ketone (SP value: 10.03; dielectric constant: 17.00), methyl isobutyl ketone (SP value: 9.58; dielectric constant: 13.11), methyl n-butyl ketone (SP value: 9.92; dielectric constant: 12.2), methyl n-propyl ketone (SP value: 9.98; dielectric constant: 15.1), dioxane (SP value: 9.73; dielectric constant: 2.21), methanol (SP value: 14.5; dielectric constant: 33.2), ethanol (SP value: 12.7; dielectric constant: 27.0), acetic acid (SP value: 12.8; dielectric constant: 9.7), pyridine (SP value: 10.6; dielectric constant: 12.4), toluene (SP value: 8.9; dielectric constant: 2.39), benzene (SP value: 9.2; dielectric constant: 2.28), xylene (SP value: 8.8–9.0; dielectric constant: 2.2–2.6), propanol (SP value: 10.2–10.7; dielectric constant: 20.1), chlorobenzene (SP value: 9.5; dielectric constant: 5.9), chloroform (SP value: 9.2; dielectric constant: 4.81), ethyl acetate (SP value: 9.0; dielectric constant: 6.12), n-butyl alcohol (SP value: 9.7–10.1; dielectric constant: 19.2), dimethyl sulfoxide (SP value: 13.2; dielectric constant: 45), water (SP value: 23.8; dielectric constant: 81), and mixed solvents composed of two or more of these.

For the invention both in the first and the second aspect thereof to work in polymerization systems in which the acrylic and/or methacrylic ester monomer proportion is 60% or more relative to the whole monomer composition, the quinone-amine compound is required to have an average molecular weight of at least 3,000. If the average molecular weight of the quinone-amine compound is less than 3,000, said compound may be partly or wholly dissolved in the acrylic or methacrylic ester monomer and fail to produce the expected effect; furthermore, the product (polymer) quality may rather be deteriorated. The solubility of the scale inhibitor increases with the increase in acrylic and/or methacrylic ester monomer content and, therefore, the molecular weight of the scale inhibitor should desirably be varied as needed. Thus, for instance, when the dissolution and admixture of the scale inhibitor in the product polymer should be avoided by any means or when the proportion of the above-mentioned monomer is high, the molecular weight should necessarily be increased.

The molecular weight of the quinone-amine compound can be adjusted by selecting the solvent mentioned above, adjusting the level of addition of the oxidizing agent, and/or adjusting the anodic oxidation process (adjusting the electric current to be applied), for instance.

In adjusting the molecular weight through solvent selection, the use of a certain amount of an alcohol or water results in a decrease in the molecular weight while nonuse of such solvent allows an increase in the molecular weight. Methanol or ethanol is suited as the alcohol to be added. The addition of water or such alcohol may be made either before or after the initiation of the reaction. When the rate of reaction is high, the addition should preferably be made before the initiation of the reaction.

In adjusting the molecular weight by adjusting the level of addition of the oxidizing agent or by means of anodic oxidation, the reaction is carried out in a solvent which is free of any alcohol or water (for example in DMF, DMAc or THF) and the total quantity of oxidizing agents or the period of anodic oxidation is adjusted in an appropriate manner to thereby terminate the polymer formation reaction at an adequate stage. The molecular weight of the quinone-amine compound can be adjusted in this manner as desired.

The oxidizing agent for the promotion of the polymer formation reaction may be added in the form of a solution or dilution in a solvent, such as water, DMF or DMAc or in the form of a solid or liquid as it is, when said oxidizing agent is a solid or liquid. When the oxidizing agent is gaseous, it may be bubbled into the reaction mixture in the form of fine bubbles through a porous material. The oxidizing agent may be added to the reaction mixture all at once, dividedly or in portions, or continuously. For attaining a sharp molecular weight distribution pattern, the whole amount of the oxidizing agent should preferably be added all at once. The combined use of two or more oxidizing agents is also effective. For instance, the addition of a small amount of such oxidizing agent as an iron(III) salt, copper(II) chloride or copper(II) sulfate may be followed by bubbling of an oxygen-containing gas or by addition of $H_2O_2$.

The level of addition of the oxidizing agent may be selected based on the number of moles of the starting materials. Generally, however, the oxidizing agent is used in an amount of 0.0001 to 5,000 parts by weight, preferably 0.1 to 500 parts by weight, more preferably 1 to 50 parts by weight, per part by weight of the sum of the starting materials. In the case of a gaseous oxidizing agent, which is fed generally by bubbling, the feed amount thereof should be determined adequately under observation of the state of the polymer formation reaction since it mostly escapes from the reaction mixture without being involved in the reaction. The feed amount thereof is not particularly limited but generally it is not more than 500,000 parts by weight per part by weight of the sum of the starting materials.

Suited for use as the oxidizing agent are relatively mild oxidizing agents, such as chromic acid, lead tetraacetate, lead dioxide, mercury(II) oxide, halogens, halo acids, oxygen, hydrogen peroxide, tert-butyl hydroperoxide, benzoyl peroxide, other organic peroxides, nitric acid, dinitrogen tetroxide, 2,3-dichloro-5,6-dicyano-1,4-benzoquinone (DDQ), o-chloranil, chloranil, silver(I) oxide, silver(I) carbonate, iron(III) salts, thallium(III) salts, cerium(IV) ammonium nitrate, nickel peroxide, chloroauric(III) acid, manganese dioxide, periodic acid, N-halocarboxamides, hypohalite esters, iodosyl compounds, copper(II) chloride, copper(II) sulfate, peroxoboric acid salts. Copper(II) chloride and iron(III) salts are preferred among them.

Addition of an acid, such as HCl or $H_2SO_4$, to the reaction mixture to render the same acidic or, conversely, addition of an alkali, such as NaOH or KOH, to render the reaction mixture basic may also be effective as a method of adjusting the rate of the polymer formation reaction after addition of the oxidizing agent. Generally, the reaction is promoted under acidic conditions and slowed down under basic conditions. In adding an alkali, the solvent should be selected with care since some solvents can react with the alkali.

The anodic oxidation for promoting the polymer formation reaction can be effected under stirring, with electrodes generally used for electrolytic processes, for example platinum or carbon electrodes, placed in the reaction mixture.

Addition of a small amount of an alkali, such as KOH or $Na_2CO_3$, to the reaction mixture is effective for accelerating the oxidation reaction. In this case, the solvent selected should be one which will neither be decomposed by nor react with the alkali. The electrode potential, oxidation time and other conditions may suitably be adjusted under observation of the electric current and the state of the polymer formation reaction, among others.

Combined use of anodic oxidation and oxidation with an oxidizing agent is also effective. For example, the addition of a small amount of an oxidizing agent such as DDQ or chloranil may be followed by regeneration of the oxidizing agent on the anode.

The range of applicability of the quinone-amine compound thus obtained can be confirmed by solubility checking with test monomer mixture systems prepared in consideration of various polymerization systems actually in use.

The effects of the thus-obtained quinone-amine compound can be further heightened by reducing the same to render it hydrophilic. Said compound may possibly be reduced at least partly on the occasion of reduction treatment of the oxidizing agent. For achieving complete reduction, however, it is advisable to subject said compound to reduction treatment again. For that purpose, a reducing agent is used or cathodic reduction is performed.

When the reducing agent is a solid or liquid, it is used in the reduction treatment either in the form of a solution or dilution in a solvent such as water, DMF or DMAc or in its original powder or liquid form. In the case of a gaseous reducing agent, it may be fed in the form of fine bubbles through a porous material, for instance.

The reducing agent is used in an amount of 0.1 to 5,000 parts by weight, preferably 0.5 to 100 parts by weight, more preferably 1 to 10 parts by weight, per part by weight of the quinone-amine compound. When a gaseous reducing agent is used, the feed amount is not particularly limited but may be adjusted properly in consideration of its escape from the reaction system. Generally, however, it should desirably be used in an amount of 100,000 parts by weight or less per part by weight of the quinone-amine compound.

Usable as the reducing agent are hydrogen and hydrogen compounds; sulfite salts such as sodium sulfite, sodium hydrogen sulfite and potassium hydrogen sulfite; sulfur compounds such as sodium sulfide, sodium polysulfide, ammonium sulfide, etc.; alkali metals, magnesium, calcium, aluminum, zinc, other metals having strong anodic property, and amalgams thereof; salts of metals in lower valence state, such as iron(II), tin(II), titanium(III) and chromium(II); and organic compounds having a low degree of oxidation, such as aldehydes, formic acid and oxalic acid. Preferred among them are sulfite salts. Thus, for instance, when sodium hydrogen sulfite is used, (1) the quinone-amine compound is dissolved in an organic solvent for coating to be mentioned later herein in a concentration of 0.5% or more and an aqueous solution of sodium hydrogen sulfite is added to the solution in an amount of 1 to 3 times the amount of the quinone-amine compound. The reduction can be carried out at ordinary temperature and ordinary pressure with stirring and the filtrate can be used as it is for the preparation of a coating composition. (2) The reduction can also be carried out by adding, to an aqueous solution of sodium hydrogen sulfite, the reaction product quinone-amine compound finely pulverized to a size of about 150 μm or less in an amount of ⅓ to 1 part per part of the solution and stirring the mixture. In this case, the reaction mixture is then filtered and the residue on the filter is washed with water and dried under reduced pressure. (3) The reduction treatment may further be carried out by adding 1 to 10 parts of sodium hydrogen sulfite in a solution form to the reaction mixture obtained after completion of the quinone-amine compound synthesis reaction and stirring the resulting mixture for 30 minutes or longer.

As the compound to be mixed with the silica organosol to be described later herein in detail, compounds derived from an aromatic diamine and an aromatic quinone, products obtained by reducing compounds derived from an aromatic diamine and an aromatic quinone, and mixtures of these can be used. In particular, the reduction products are preferred.

Suitable for use as the silica organosol are alcoholic silica sols, such as methanolic silica sol, ethanolic silica sol, butanolic silica sol, isobutanolic silica sol, tert-butanolic silica sol, isopropanolic silica sol, n-propanolic silica sol, n-heptanolic silica sol and n-octanolic silica sol, silica sol in n-pentane, silica sol in n-hexane, silica sol in DMF, silica sol in morpholine, silica sol in toluene, silica sol in xylene, and so forth. Among these, n-butanolic silica sol and methanolic silica sol are particularly preferred.

The term "silica organosol" or "silica sol" as used herein means a colloidal dispersion of negatively charged amorphous silica particles in an organic solvent. On the particle surface, —SiOH groups are present. From the viewpoints of hydrophilic property and reactivity with alkyl silicates, the entire silica particle surface should desirably be covered with —SiOH groups. Preferable as such silica are products obtained from monomeric silicic acid by condensation under dehydration of the silanol groups of said silicic acid.

Compositions particularly effective in preventing scale deposition in accordance with the first aspect of the invention contain the quinone-amine compound and/or a reduced form thereof and the silica organosol in a weight ratio of 1:0.01 to 1:30, preferably 1:0.01 to 1:10, more preferably 1:0.01 to 1:5, most preferably 1:0.01 to 1:0.15.

As the alkyl silicate to be used in accordance with the second aspect of the invention, methyl silicate, ethyl silicate, butyl silicate and the like are preferred.

In compositions particularly preferable from the viewpoint of the balance between scale preventing effect and hydrophilic coat film adherence and particularly suited for the practice of the invention in its second aspect, the weight ratio between the silica organosol (on the solids basis) and the alkyl silicate is 1:0.01 to 1:1, preferably 1:0.1 to 1:0.7, more preferably 1:0.1 to 1:0.4 and the weight ratio between the quinone-amine compound and/or a reduced form thereof and the silica organosol (on the solids basis) is 1:0.01 to 1:10, preferably 1:0.01 to 1:5, more preferably 1:0.1 to 1:0.5.

For obtaining firm and uniform films, the mole ratio between the water in the silica organosol and the alkyl silicate should desirably be not more than 2 and the mixture of the silica organosol and the alkyl silicate should desirably have a pH of 4 to 7.

The quinone-amine compound obtained by reacting an aromatic diamine and an aromatic quinone and a reduced form of said quinone-amine compound, each to be used in accordance with the first and the second aspect of the invention, are almost insoluble in water, alcohols, straight-chain hydrocarbons, aromatic hydrocarbons, halogenated hydrocarbons and the like. They are insoluble also in monomers having a double bond which will occur as a single bond after polymerization.

The organic solvent for dissolving the quinone-amine compound or a reduced form thereof is first required to have a high dissolving power and should desirably have an SP value of 9.8 to 12.5. As such organic solvent, there may be mentioned primary amides such as dimethylformamide and dimethylacetamide; sulfoxides such as dimethyl sulfoxide; ketones such as acetone, methyl ethyl ketone, diethyl ketone and methyl n-propyl ketone; nitriles such as acetonitrile; pyridine; and morpholine, among others. A suitable solvent may be selected from among these in consideration of the molecular weight of the quinone-amine compound and/or a reduced form thereof (namely the solubility or solution concentration), the stability thereof, the processability of the resultant coating composition, and so forth. In cases where a high-boiling solvent must be used, it becomes necessary to dry the coat film by heating under reduced pressure.

Secondly, the solvent is required to have a low surface tension for achieving uniform coating of the polymerization reactor inside surfaces. No uniform coat film will be formed unless the substrate surface to be coated can be wet with ease. Therefore, for coating stainless steel (SUS304) surfaces, the organic solvent should have a surface tension smaller than 30 dyn/cm. In cases where a solvent showing a great surface tension must be selected from among the abovementioned solvents having a high dissolving power, it is necessary to adjust the surface tension by using a solvent with a low surface tension in combination.

As the solvent low in surface tension, there may be mentioned, for example, methyl n-propyl ketone, amyl acetate, n-butanol, THF and ethanol. Addition of these in an amount of 3 to 50% by volume will be sufficient. When the substrate or base material is stainless steel, the uniformity of the coat film can be improved by adding, to the solvent for coating, 0.1 to 0.3% by weight of an organic acid such as thiosalicylic acid, benzoic acid, palmitic acid or stearic acid, a strong inorganic acid such as sulfamic acid, or a chelating agent such as ethylenediaminetetraacetic acid disodium salt, although the reason or mechanism is unknown. In both cases, however, care should be used since the dissolving power of the solvent itself will be reduced. An organic solvent suited for the actual polymerization system should be selected in due consideration of the above respects.

The compositions comprising the quninone-amine compound and/or a reduced form thereof in combination with (1) the silica organosol or (2) the silica organosol and the alkyl silicate may be prepared by adding the silica organosol or an intimate mixture of the silica organosol and the alkyl silicate to a solution of the quinone-amine compound and/or a reduced form thereof, followed by thorough mixing.

The final solvent composition in the coating compositions prepared in the above manner in accordance with the first and the second aspect of the invention thus comprises two or more organic solvents, namely the organic solvent in the above-mentioned quinone-amine compound solution, which may be a mixed solvent, plus the organic solvent or alcohol which is the dispersion medium for the silica organosol or alcoholic silica sol.

The material of construction of the polymerization reactors may be a species of stainless steel, such as SUS 304, 316 or 316L, or a glass lining, for instance. In particular, stainless steel species are preferred in the practice of the invention in its first aspect, whereas the material of construction may be a stainless steel species or a glass lining in the practice of the invention in its second aspect.

The coating composition in accordance with the first aspect of the invention and the coating composition in accordance with the second aspect of the invention may be applied to the polymerization reactor inside surfaces, both by the same method, for example by spraying or brushing, in an amount of 0.01 to 5 grams, preferably 0.1 to 1 gram, per square meter of the wall surface or the like. An amount exceeding 5 g/m$^2$ may be used if no adverse influences are exerted on the coat film formation or the polymerization reactor.

The amount of coating may vary greatly depending on the concentration of the coating composition. If the concentration of the film-forming components in the coating composition is too low, several repeated coating procedures will be required since, in this case, the film thickness after one application is too small. In that case, the coating composition may scatter in the polymerization reactor and/or sag and gather in the lower part of the polymerization reactor in each coating procedure and thus the coating composition may be required in large quantities. In addition, the coating time and/or drying time will become long. To avoid these economic drawbacks, the film-forming component concentration should desirably be relatively high. Thus, a concentration of 0.1% or higher, in particular 0.5 to 2%, is preferred.

The present invention, both in its first and second aspects, can be applied to polymerization systems in which monomers having an ethylenic double bond and/or diolefinic double bonds are used. Such monomers include, but are not limited to, acrylic esters such as methyl acrylate, ethyl acrylate, butyl acrylate, octyl acrylate, dodecyl acrylate, cyclohexyl acrylate, β-hydroxyethyl acrylate, glycidyl acrylate, cyanoethyl acrylate and alkoxycarbonylmethyl acrylate; methacrylic esters such as methyl methacrylate, ethyl methacrylate and butyl methacrylate; vinyl aromatics such as styrene, α-methylstyrene, o-chlorostyrene and vinyltoluene; crosslinking monomers such as butadiene, isoprene, chloroprene, acrylic acid, methacrylic acid, itaconic acid, maleic acid, vinyl acetate, ethylene, propylene, butylene and vinylnaphthalene; vinyl cyanides such as acrylonitrile and methacrylonitrile; vinyl acetate; vinyl halides such as vinyl chloride, vinyl bromide and vinyl fluoride; and vinylidene halides such as vinylidene chloride and vinylidene bromide. In accordance with the first and the second aspect of the invention, an excellent scale deposition preventing effect and an excellent scale peelability improving effect can be produced in polymerization systems in which one or more of these monomers are emulsion-polymerized or suspension-polymerized.

The present invention, in its first and second aspects, is particularly useful in the following polymerization systems, among others:

(1) Acrylic ester, methacrylic ester and/or styrene polymerization systems in which the monomer composition comprises 0 to 100% of one or more acrylic esters, 0 to 100% of one or more methacrylic esters and 0 to 100% of styrene.

(2) Butadiene polymerization systems in which the monomer composition comprises 0 to 50% of styrene and 50 to 100% of butadiene.

(3) Systems for polymerizing 20 to 80 parts (parts by weight; hereinafter the same shall apply) of a monomer composition comprising 0 to 30% of one or more acrylic esters, 0 to 100% of one or more methacrylic esters, 0 to 90% of one or more vinyl aromatics, 0 to 90% of one or more vinyl cyanides and 0 to 20% of one or more other copolymerizable monomers in the presence of 20 to 80 parts of the butadiene-based polymer latex obtained in (2).

(4) Systems for polymerizing 80 to 100 parts of a monomer composition comprising 0 to 100% of methyl methacrylate, 0 to 60% of one or more methacrylic esters other than methyl methacrylate or one or more acrylic esters, 0 to 90% of one or more vinyl aromatics and 0 to 90% of one or more vinyl cyanides in the presence of 0 to 20 parts of a rubber-like polymer latex comprising 0 to 50% of styrene, 50 to 100% of butadiene and 0 to 30% of one or more acrylic esters.

(5) Systems for polymerizing a monomer composition comprising 5 to 70 mole percent of α-methylstyrene and 30 to 95 mole percent of one or more monomers selected from among vinyl aromatics, methacrylic esters, acrylic esters, acrylic acid and vinyl cyanides.

(6) Systems for polymerizing 15 to 95 parts of one or more monomers selected from among methacrylic esters, vinyl cyanides, acrylic esters, vinyl aromatics and monomers copolymerizable with these in the presence of 5 to 85 parts of a rubber polymer obtained by polymerizing 40 to 100% of one or more acrylic esters, 0 to 60% of one or more monomers selected from among vinyl aromatics, vinyl cyanides, vinyl chloride, vinylidene chloride, vinyl acetate and conjugated diolefins and 0 to 10% of one or more crosslinking agents.

(7) Systems for polymerizing a monomer composition comprising 20 to 80 parts of acrylonitrile monomer, 20 to 80 parts of vinyl chloride, vinylidene chloride, vinyl bromide or vinylidene bromide or a mixture of two or more of these, and 0 to 10 parts of one or more readily dyeable monomers.

(8) Systems for polymerizing 40 to 100 parts of vinyl chloride, 0 to 20 parts of one or more vinyl cyanides and 0 to 60 parts of one or more monomers selected from among vinyl bromide, vinylidene bromide, acrylic esters, methacrylic esters, acrylic acid, methacrylic acid, itaconic acid, maleic acid and othe crosslinking monomers.

(9) Systems for polymerizing 40 to 100 parts of vinylidene chloride and 0 to 60 parts of one or more monomers selected from among vinyl aromatics, vinyl cyanides, acrylic esters, methacrylic esters, acrylic acid, methacrylic acid, itaconic acid, maleic acid and other crosslinking monomers.

As the polymerization initiating catalyst for the emulsion polymerization or suspension polymerization of the above monomers, there may be mentioned, for example, water-soluble persulfates, such as potassium persulfate and ammonium persulfate, oil-soluble polymerization initiators, such as cumene hydroperoxide, p-menthane hydroperoxide, tert-butyl hydroperoxide, tert-butyl peroxy isopropyl carbonate, $\alpha,\alpha'$-azobisisobutyl carbonate and $\alpha,\alpha'$-azobisisobutyronitrile, and redox system polymerization initiators.

As the emulsifying agent to be used in carrying out emulsion polymerization processes in accordance with the first and the second aspect of the invention, there may be mentioned, for example, anionic surfactants, such as sodium lauryl sulfate, sodium stearate, sodium dodecylbenzenesulfonate, sodium palmitate, potassium oleate, potassium rosinate, paraffinsulfonic esters and naphthalenesulfonic esters, and nonionic surfactants, such as sorbitan monolaurate, polyethylene glycol monolaurate and polyoxyethylene alkyl ethers.

As the dispersing agent to be used in carrying out suspension polymerization processes in accordance with the first and the second aspect of the invention, there may be mentioned, for example, partially saponified polyvinyl acetate; polyacrylic acid, styrene- or vinyl acetate-maleic acid copolymers; cellulose derivatives such as methylcellulose; and known synthetic or natural macromolecular compounds such as gelatin.

Chain transfer agents, electrolytes and so forth may be added as necessary as polymerization aids.

As mentioned hereinabove, in accordance with the above-mentioned first and second aspects of the invention, polymer scale deposition on those portions which come into contact with monomers, such as the inside wall of the polymerization reactor, the agitator shaft and blades, the baffle-plates and the temperature measuring device, can be reduced remarkably and the peelability or removability of the scales that have deposited can be increased markedly. These effects can be produced irrespective of the method of polymerization, the monomer species, the polymerization system composition and other factors.

In accordance with the second aspect of the invention, a firm and uniform film, which has been considered difficult to form on the glass lining surface, can be formed even on the glass-lined polymerization reactor surface without reducing the effects that are producible in accordance with the first aspect of the invention. The life of aged glass-lined polymerization reactors can thus be prolonged. It is also an advantage from the industrial viewpoint that a firm and uniform film can be formed on the stainless steel polymerization reactor surface as well.

In accordance with either of the first and the second aspect of the invention, scale deposition on the polymerization reactor inside wall and so forth can be prevented almost completely even in polymerization systems in which an acrylic or methacrylic ester monomer or an acrylic and/or methacrylic ester monomer mixture accounts for 60% or more of all monomers present in the polymerization reactor, in particular in polyacrylate- or polymethacrylate-producing polymerization systems in which the above monomer or monomer mixture accounts for 100% of the whole monomer composition. The scale preventing effect can be still maintained after 300 batches of polymerization or more.

DETAILED DESCRIPTION OF PREFERRED EMBODIMENTS

The following preparation examples and working examples illustrate the first and the second aspect of the present invention in further detail. It is to be noted, however, that such examples are by no means limitative of the scope of the present invention. "Part(s)" means "part(s) by weight".

Comparative Preparation Example 1

(Quinone-amine compound No. 1)

Tetraethylenepentamine (0.8 part), 0.5 part of p-phenylenediamine and 1.4 parts of p-aminobenzoic acid were dissolved in 150 parts of ethanol (SP value 12.7, dielectric constant 25.7) to give a solution (A).

Separately, 4 parts of salicylaldehyde, 1 part of pyrogallol and 4 parts of hydroquinone were dissolved in a mixed solvent composed of 45 parts of ethanol and 45 parts of purified water to give a solution (B).

The solutions (A) and (B) were mixed together and evaporated to dryness at ambient temperature under reduced pressure. The average molecular weight of the thus-obtained quinone-amine compound as measured by gel permeation chromatography (GPC) was not more than 1,800.

Comparative Preparation Example 2

(Quinone-amine compound No. 2)

A reaction reactor was charged with 100 parts of ethanol, and 3 parts of $\beta$-naphthoquinone and 1 part of 1,8-diaminonaphthalene were added with stirring at 30° C. Upon addition of the 1,8-diaminonaphthalene, the reaction mixture assumed a dark red color. The stirring was discontinued and the reaction was then allowed to proceed by allowing the mixture to stand at 30° C. for 4 days. The resultant crystalline precipitate was collected by filtration, washed repeatedly with ethanol until the ethanol washings showed no more substantial coloration, and then dried under reduced pressure to give a quinone-amine compound (average molecular weight about 700).

Comparative Preparation Example 3

(Quinone-amine compound No. 3)

Four (4) parts of p-phenylenediamine was dissolved in 100 parts of purified water to give a solution (C). Separately, 4 parts of hydroquinone was dissolved in 100 parts of purified water to give a solution (D).

The solutions (C) and (D) were mixed together and air was blown into the mixture for 40 minutes. When the color of the reaction mixture changed from a salmon pink color to a dark one, the reaction procedure was discontinued and the reaction mixture was filtered to give a quinone-amine compound as a cake. The average molecular weight of this product as measured by GPC was about 1,800.

Preparation Example 1

(Quinone-amine compound No. 4)

A reaction reactor was charged with 100 parts of THF and, at 30° C., 15 parts of $\beta$-naphthoquinone and 5 parts of 1,8-diaminonaphthalene were added with stirring Upon addition of the 1,8-diaminonaphthalene, the reaction mixture assumed a dark red color. The stirring was discontinued and the reaction was allowed to proceed by allowing the mixture to stand at 30° C. for 75 days. The resultant crystalline precipitate was collected by filtration, washed repeatedly with THF until the THF washings showed no more substantial coloration, and then dried under reduced pressure to give a quinone-amine compound. Analysis of this product by GPC revealed that it had an average molecular weight of about 8,500. The yield based on the total weight of reactants (hereinafter briefly referred to as "yield") of the quinone-amine compound was about 7%.

Preparation Example 2

(Quinone-amine compound No. 5)

A reaction reactor was charged with 200 parts of THF and, at 30° C., 5 parts of p-benzoquinone and 5 parts of p-phenylenediamine were added with stirring. Upon addition of the p-phenylenediamine, the reaction mixture assumed a dark red color. The stirring was discontinued and the reaction was then allowed to proceed by allowing the mixture to stand at 30° C. for 30 days. The resultant crystalline precipitate was collected by filtration, washed repeatedly with THF until the THF washings showed no more substantial coloration, and then dried under reduced pressure to give a quinone-amine compound. The average molecular weight of this product as measured by GPC was about 7,000. The yield was about 20%.

Preparation Example 3

(Quinone-amine compound No. 6)

A reactor reactor was charged with 90 parts of methanol and 10 parts of THF and, at 30° C., 5 parts of $\beta$-naphthoquinone and 5 parts of 1,8-diaminonaphthalene were added with stirring. Upon addition of the 1,8-diaminonaphthalene, the reaction mixture assumed a dark red color. Ten minutes later, 17.1 parts of powdery $FeCl_3.6H_2O$ was added to the reaction mixture. The reaction was allowed to proceed by maintaining the mixture at 30° C. for 30 seconds and then terminated by pouring the mixture into 500 parts of an aqueous solution containing 100 parts of sodium hydrogen sulfite and stirring the resultant mixture for 5 minutes. The resultant precipitate was immediately collected by filtration, washed with distilled water to an extent sufficient for iron salt removal, then repeatedly washed with MMA until the MMA washings showed no more substantial coloration, and dried under reduced pressure to give a quinone-amine compound. Analysis of this product by GPC revealed that it had an average molecular weight of about 15,000. The yield was about 75%.

Preparation Example 4

(Quinone-amine compound No. 7)

A reaction reactor was charged with 180 parts of methanol and 20 parts of THF and, at 50° C., 5 parts of p-benzoquinone and 5 parts of 1,8-diaminonaphthalene were added with stirring. Upon addition of the 1,8-diaminonaphthalene, the reaction mixture assumed a dark red color. Ten minutes later, 160 parts of an aqueous solution containing 10.5 parts of $CuCl_2$, the reaction was allowed to proceed at 50° C. for 5 hours and, then, the stirring was discontinued. The reaction mixture was poured into 1,000 parts of an aqueous solution containing 50 parts of sodium hydrogen sulfite and the whole mixture was stirred for 5 minutes, whereby the reaction was terminated. The precipitate was immediately collected by filtration, washed with distilled water to an extent sufficient for copper salt removal, then washed repeatedly with MMA until the MMA washings showed no more substantial coloration, and dried under reduced pressure to give a quinone-amine compound. The average molecular weight of this product as measured by GPC was about 20,000. The yield was about 60%.

Preparation Example 5

(Quinone-amine compound No. 8)

A reaction reactor was charged with 200 parts of THF and, at 30° C., 5 parts of p-benzoquinone and 5 parts of p-phenylenediamine were added with stirring. Upon addition of the p-phenylenediamine, the reaction mixture assumed a dark red color. Ten minutes later, 10 parts of powdery $FeCl_3.6H_2O$ was added. The reaction was allowed to proceed at 30° C. for 20 minutes, the stirring was then discontinued, the reaction mixture was poured into 500 parts of an aqueous solution containing 50 parts of sodium hydrogen sulfite and the whole mixture was stirred for 5 minutes, whereby the reaction was terminated. The resultant precipitate was immediately collected by filtration, washed with distilled water to an extent sufficient for iron salt removal, then washed repeatedly with THF until the THF washings showed no more substantial coloration, and dried under reduced pressure to give a quinone-amine compound. The average molecular weight of this product as measured by GPC was about 20,000. The yield was about 55%.

Preparation Example 6

(Quinone-amine compound No. 9)

A reaction reactor was charged with 50 parts of THF and 30 parts of methanol and, at 30° C., 5 parts of $\beta$-naphthoquinone and 5 parts of 1,8-diaminonaphthalene were added with stirring. Upon addition of the 1,8-diaminonaphthalene, the reaction mixture assumed a dark red color. Thirty minutes later, 50 parts of a 3% aqueous solution of $H_2O_2$ was added and the reaction was allowed to proceed at 30° C. for 3 hours. Then, the stirring was discontinued, the reaction mixture was poured into 500 parts of an aqueous solution containing 40 parts of sodium hydrogen sulfite and the whole mixture was stirred for 5 minutes, whereby the reaction was terminated. The resultant precipitate was immediately collected by filtration, washed with distilled water to a sufficient extent, then washed repeatedly with MMA until the MMA washings showed no more coloration, and dried under reduced pressure to give a quinone-amine compound. The average molecular weight of this product as measured by GPC was about 8,000. The yield was about 25%.

Preparation Example 7

(Quinone-amine compound No. 10)

A reaction reactor was charged with 100 parts of THF and, at 30° C., 1 part of 9,10-phenanthraquinone and 1 part of 1,2-diaminonaphthalene were added with stirring. Upon addition of the 1,2-diaminonaphthalene, the reaction mixture assumed a yellowish red brown color. Two hours later, 100 parts of an aqueous solution containing 30 parts of $CuSO_4$ was added and the reaction was allowed to proceed at 30° C. for 10 hours. Then, the stirring was discontinued, the reaction mixture was poured into an aqueous solution containing 100 parts of sodium hydrogen sulfite and the resultant mixture was stirred for 5 minutes, whereby the reaction was terminated. The precipitate was immediately collected by filtration, washed with distilled water to an extent sufficient for copper salt removal, then repeatedly washed with MMA until the MMA washings showed no more substantial coloration, and dried under reduced pressure to give a quinone-amine compound. The average molecular weight of this product as measured by GPC was about 10,000. The yield was about 60%.

Preparation Example 8

(Quinone-amine compound No. 11)

A reaction reactor was charged with 90 parts of acetone and 90 parts of ethanol and, at 20° C., 3 parts of $\beta$-naphthoquinone and 3 parts of 1,8-diaminonaphthalene were added with stirring. Upon addition of the 1,8-diaminonaphthalene, the reaction mixture assumed a dark red color. Ten minutes later, 100 parts of an aqueous solution containing 60 parts of $FeCl_3$ and the reaction was allowed to proceed at 30° C. for 30 minutes. Then, the stirring was discontinued, the reaction mixture was poured into 1,000 parts of an aqueous solution containing 200 parts of sodium hydrogen sulfite and the resultant mixture was stirred for 5 minutes, whereby the reaction was terminated. The resultant precipitate was immediately collected by filtration, washed with distilled water to an extent sufficient for iron salt removal, then washed repeatedly with acetone until the acetone washings showed no more coloration, and dried under reduced pressure to give a quinone-amine compound. The average molecular weight of this product as measured by GPC was about 8,000. The yield was about 80%.

Preparation Example 9

(Quinone-amine compound No. 12)

A reaction reactor was charged with 50 parts of THF and 45 parts of methanol and, at 30° C., 5 parts of $\beta$-naphthoquinone and 5 parts of 1,8-diaminonaphthalene were added with stirring. Upon addition of the 1,8-diaminonaphthalene, the reaction mixture assumed a dark red color. Thirty minutes later, 7 parts of powdery $FeCl_3.6H_2O$ was added to the reaction mixture and the reaction was allowed to proceed at 30° C. for 2 hours. Then, the stirring was discontinued, the reaction mixture was poured into 1,000 parts of an aqueous solution containing 50 parts of sodium hydrogen sulfite and the resultant mixture was stirred for 5 minutes, whereby the reaction was terminated. The resultant precipitate was immediately collected by filtration, washed with distilled water to an extent sufficient for iron salt removal, then washed repeatedly with MMA until the MMA washings showed no more substantial coloration, and dried under reduced pressure to give a quinone-amine compound. The average molecular weight of this product as measured by GPC was about 13,000. The yield was about 70%.

Preparation Example 10

(Quinone-amine compound No. 13)

A reaction reactor was charged with 90 parts of methanol and 10 parts of THF and, at 60° C., 5 parts of 8-naphthoquinone and 5 parts of 1,8-diaminonaphthalene, the reaction mixture assumed a dark red color. Ten minutes later, 15 parts of an aqueous solution containing 3 parts of $FeCl_3$ was added to the reaction mixture and the reaction was allowed to proceed at 60° C. for 10 hours while air was passed through the mixture at a flow rate of 30 ml per minute via a 10-cm-long porous Teflon tube (Fluoropore tube manufactured by Sumitomo Electric Industries; inside diameter 3 mm, outside diameter 4 mm, porosity 60%, pore diameter 0.1 $\mu$m) with one end closed. The solvent losses due to evaporation which occurred in spite of the use of a reflux condenser cooled with cold water were covered up from time to time. The stirring was then discontinued, the reaction mixture was poured into 500 parts of an aqueous solution containing 50 parts of sodium hydrogen sulfite and the resultant mixture was stirred for 5 minutes, whereby the reaction was terminated. The precipitate was immediately collected by filtration, washed with distilled water to an extent sufficient for iron salt removal, washed repeatedly with MMA until the MMA washings showed no more substantial coloration, and dried under reduced pressure to give a quinone-amine compound. The average molecular weight of this product as measured by GPC was about 9,000. The yield was about 45%.

Preparation Example 11

(Quinone-amine compound No. 14)

A reaction reactor was charged with 90 parts of methanol and 10 parts of THF and, at 30° C., 5 parts of $\beta$-naphthoquinone and 5 parts of 1,8-diaminonaphthalene were added with stirring. Upon addition of the 1,8-diaminonaphthalene, the reaction mixture assumed a dark red color. Ten minutes later, 5 parts of powdery $FeCl_3.6H_2O$ was added to the reaction mixture, followed by addition of 20 parts of 3% aqueous $H_2O_2$. The reaction was allowed to proceed at 30° C. for 15 minutes Then, the stirring was discontinued, the reaction mixture was poured into 500 parts of an aqueous solution containing 50 parts of sodium hydrogen sulfite and the resultant mixture was stirred for 5 minutes, whereby the reaction was terminated. The resultant precipitate was immediately collected by filtration, washed with distilled water to an extent sufficient for iron salt removal, then washed repeatedly with MMA until the MMA washings showed no more substantial coloration, and dried under reduced pressure to give a quinone-amine compound. The average molecular weight of this product as measured by GPC was about 12,000. The yield was about 35%.

Preparation Example 12

(Quinone-amine compound No. 15)

A reaction reactor was charged with 90 parts of methanol, 10 parts of DMAc and 0.1 part of KOH and, at 30° C., 5 parts of p-quinone and 5 parts of 1,8-diaminonaphthalene were added with stirring. Upon addition of the 1,8-diaminonaphthalene, the reaction mixture assumed a dark red color. An hour later, carbon electrodes were immersed in the reaction mixture and anodic oxidation was performed for 23 hours at a voltage of 10 V and a current of about 120 mA. Gas evolved from the cathode during the reaction period The stirring was discontinued and the resultant precipitate was collected by filtration, washed well with distilled water, then washed repeatedly with MMA until the MMA washings showed no more substantial coloration, and dried under reduced pressure to give a quinone-amine compound. The average molecular weight of this product as measured by GPC was about 13,000. The yield was about 25%.

Preparation Example 13

(Reduced-form quinone-amine compounds)

The reaction procedure in each of Preparation Examples 1-12 for the synthesis of quinone-amine compounds No. 4 to No. 15 was followed as mentioned above and, after termination of the reaction, 10 parts, per part of the quinone-amine compound, of a 20% solution of sodium hydrogen sulfite was added to the reaction mixture. The whole mixture was stirred at ambient temperature for 5 hours for reduction treatment. The resultant precipitate was collected by filtration, washed with distilled water to an extent sufficient for iron or copper salt elimination, then washed repeatedly with MMA until the MMA washings showed no more substantial coloration, and dried under reduced pressure to give a reduced-form quinone-amine compound (product derived from the corresponding quinone-amine compound by treatment for reduction).

Example 1

The inside wall of a 100-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 1 in the organic solvent specified in Table 1 in a total concentration [A+B (as solids)+C] of 1%, then dried in vacuo at 70° C. for 2 hours and washed with water. The polymerization reactor was charged with 62,000 g of pure water, 23,900 g of methyl methacrylate (MMA), 2,660 g of ethyl acrylate (EA), 400 g of sodium dioctyl sulfosuccinate (as emulsifier) and 53 g of potassium persulfate (as catalyst). The polymerization was carried out at 50° C. (reactor inside temperature) with stirring for 6 hours. Then, the polymerizate was taken out from the polymerization reactor, and the polymerization reactor inside was washed with water and observed for polymer scale deposition. The observation results are shown in Table 1.

In the table, the "state of film" means the "state of the coating composition film" and the "peelability" means the "peelability of the polymer scale". The peelability was evaluated according to the following criteria:

A: The scale spontaneously peels off.
B: The scale is peeled off when a water stream is applied thereto from a distance of 1 m at a flow rate of 2 liters per minute under a pressure of 1.0 kg/cm$^2$.
C: The scale is peeled off when a water stream is applied thereto from a distance of 1 m at a flow rate of 2 liters per minute under a pressure of 5.0 kg/cm$^2$.
D: The scale is peeled off when a water stream is applied thereto from a distance of 1 m at a flow rate of 2 liters per minute under a pressure of 20 kg/cm$^2$.
E: The scale will not peel off even when a water stream is applied thereto from a distance of 1 m at a flow rate of 2 liters per minute under a pressure of 20 kg/cm$^2$.

TABLE 1

| Test Example | | Scale inhibitor solution | | B: Silica organosol | C: Alkyl silicate | A:B:C (weight ratio) | Quantity of scale [g/m$^2$] | Peelability | State of film |
|---|---|---|---|---|---|---|---|---|---|
| | | A: Scale inhibitor | Organic solvent (weight ratio) | | | | | | |
| 1 | Comparative | None | — | — | — | — | 560 | E | — |
| 2 | Comparative | None | MeOH | Methanolic | — | 0:100:0 | 800 | D | Not Peelable |
| 3 | Comparative | None | n-BuOH | n-Butanolic | — | 0:100:0 | 780 | D | Not Peelable |
| 4 | Comparative | Sodium anthraquinone-disulfonate | MeOH | — | — | 100:0:0 | 360 | E | Peelable |
| 5 | Comparative | Phenyl-α-naphthylamine | MeOH | — | — | 100:0:0 | 360 | E | Peelable |
| 6 | Comparative | p-Aminodiphenylamine | MeOH | — | — | 100:0:0 | 330 | E | Peelable |
| 7 | Comparative | Compound No. 1 | DMF/n-BuOH = 9/1 | — | — | 100:0:0 | 290 | E | Peelable |
| 8 | Comparative | Compound No. 2 | DMF/n-BuOH = 9/1 | — | — | 100:0:0 | 320 | E | Peelable |
| 9 | Comparative | Compound No. 3 | DMF/n-BuOH = 9/1 | — | — | 100:0:0 | 300 | E | Peelable |
| 10 | Comparative | Compound No. 4 (unreduced form) | DMF/n-BuOH/morphorine = 8/1/1 | — | — | 100:0:0 | 129 | E | Not Peelable |
| 11 | Comparative | Compound No. 6 (unreduced form) | DMF/n-BuOH = 9/1 | — | — | 100:0:0 | 122 | E | Not Peelable |
| 12 | Comparative | Compound No. 7 (unreduced form) | DMF/n-BuOH = 9/1 | — | — | 100:0:0 | 125 | E | Not Peelable |
| 13 | Comparative | Compound No. 8 (unreduced form) | DMF/n-BuOH = 9/1 | — | — | 100:0:0 | 121 | E | Not Peelable |
| 14 | Comparative | Compound No. 10 (unreduced form) | DMF/n-BuOH = 9/1 | — | — | 100:0:0 | 139 | E | Not Peelable |
| 15 | Comparative | Compound No. 13 (unreduced form) | DMF/n-BuOH = 9/1 | — | — | 100:0:0 | 130 | E | Not Peelable |
| 16 | Comparative | Compound No. 4 (reduced form) | DMF/n-BuOH/morphorine = 8/1/1 | — | — | 100:0:0 | 110 | E | Not Peelable |
| 17 | Comparative | Compound No. 6 (reduced form) | DMF/n-BuOH = 9/1 | — | — | 100:0:0 | 112 | E | Not Peelable |
| 18 | Comparative | Compound No. 7 (reduced form) | DMF/n-BuOH = 9/1 | — | — | 100:0:0 | 112 | E | Not Peelable |
| 19 | Comparative | Compound No. 8 (reduced form) | DMF/n-BuOH = 9/1 | — | — | 100:0:0 | 111 | E | Not Peelable |
| 20 | Comparative | Compound No. 10 (reduced form) | DMF/n-BuOH = 9/1 | — | — | 100:0:0 | 125 | E | Not Peelable |

TABLE 1-continued

| Test Example | | Scale inhibitor solution A: Scale inhibitor | Organic solvent (weight ratio) | B: Silica organosol | C: Alkyl silicate | A:B:C (weight ratio) | Quantity of scale [g/m²] | Peel-abil-ity | State of film |
|---|---|---|---|---|---|---|---|---|---|
| 21 | Comparative | Compound No. 13 (reduced form) | DMF/n-BuOH = 9/1 | — | — | 100:0:0 | 122 | E | Not Peelable |
| 22 | Invention | Compound No. 4 (unreduced form) | DMF/n-BuOH/morpholine = 8/1/1 | n-Butanolic | — | 90:10:0 | 9 | B | Not Peelable |
| 23 | Invention | Compound No. 6 (unreduced form) | DMF/n-BuOH = 9/1 | n-Butanolic | — | 90:10:0 | 1 | B | Not Peelable |
| 24 | Invention | Compound No. 7 (unreduced form) | DMF/n-BuOH = 9/1 | n-Butanolic | — | 90:10:0 | 2 | B | Not Peelable |
| 25 | Invention | Compound No. 8 (unreduced form) | DMF/n-BuOH = 9/1 | n-Butanolic | — | 90:10:0 | 5 | B | Not Peelable |
| 26 | Invention | Compound No. 10 (unreduced form) | DMF/n-BuOH = 9/1 | n-Butanolic | — | 90:10:0 | 21 | C | Not Peelable |
| 27 | Invention | Compound No. 13 (unreduced form) | DMF/n-BuOH = 9/1 | n-Butanolic | — | 90:10:0 | 11 | C | Not Peelable |
| 28 | Invention | Compound No. 4 (reduced form) | DMF/n-BuOH/morpholine = 8/1/1 | n-Butanolic | — | 90:10:0 | 0 | A | Not Peelable |
| 29 | Invention | Compound No. 6 (reduced form) | DMF/n-BuOH = 9/1 | n-Butanolic | — | 90:10:0 | 0 | A | Not Peelable |
| 30 | Invention | Compound No. 7 (reduced form) | DMF/n-BuOH = 9/1 | n-Butanolic | — | 90:10:0 | 0 | A | Not Peelable |
| 31 | Invention | Compound No. 8 (reduced form) | DMF/n-BuOH = 9/1 | n-Butanolic | — | 90:10:0 | 0 | A | Not Peelable |
| 32 | Invention | Compound No. 10 (reduced form) | DMF/n-BuOH = 9/1 | n-Butanolic | — | 90:10:0 | 10 | B | Not Peelable |
| 33 | Invention | Compound No. 13 (reduced form) | DMF/n-BuOH = 9/1 | n-Butanolic | — | 90:10:0 | 2 | B | Not Peelable |
| 34 | Invention | Compound No. 4 (reduced form) | DMF/n-BuOH/morpholine = 8/1/1 | n-Butanolic | — | 33:67:0 | 2 | B | Not Peelable |
| 35 | Invention | Compound No. 6 (reduced form) | DMF/n-BuOH = 9/1 | Methanolic | — | 33:67:0 | 2 | B | Not Peelable |
| 36 | Invention | Compound No. 8 (reduced form) | DMF/n-BuOH = 9/1 | Methanolic | — | 33:67:0 | 3 | B | Not Peelable |
| 37 | Invention | Compound No. 4 (reduced form) | DMF/n-BuOH = 9/1 | DMF-based | — | 95:5:0 | 90 | C | Not Peelable |
| 38 | Invention | Compound No. 6 (reduced form) | DMF/n-BuOH 1 9/1 | DMF-based | — | 9:91:0 | 81 | C | Not Peelable |
| 39 | Invention | Compound No. 7 (reduced form) | DMF/n-BuOH = 9/1 | DMF-based | — | 9:91:0 | 74 | C | Not Peelable |
| 40 | Invention | Compound No. 4 (reduced form) | DMF/n-BuOH = 9/1 | n-Butanolic | Ethyl silicate | 85:13:2 | 0 | A | Not Peelable |
| 41 | Invention | Compound No. 6 (reduced form) | DMF/n-BuOH = 9/1 | n-Butanolic | Ethyl silicate | 85:13:2 | 0 | A | Not Peelable |
| 42 | Invention | Compound No. 7 (reduced form) | DMF/n-BuOH = 9/1 | n-Butanolic | Methyl silicate | 29:58:13 | 0 | A | Not Peelable |
| 43 | Invention | Compound No. 10 (reduced form) | DMF/n-BuOH = 9/1 | n-Butanolic | Methyl silicate | 29:58:13 | 3 | B | Not Peelable |

Example 2

The inside wall of a 3-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 2 in the organic solvent specified in Table 2 in a total concentration [A+B (as solids)+C] of 1%, then dried in vacuo at 70° C. for 2 hours and washed with water. This polymerization reactor was charged with 800 g of pure water, 20 g of potassium oleate, 2 g of tripotassium phosphate, 0.4 g of Rongalite, 0.02 g of ethylenediaminetetraacetic acid disodium salt, 0.012 g of ferrous sulfate, 120 g of styrene, 280 g of 1,3-butadiene and 0.4 g of p-menthane hydroperoxide. The polymerization was carried out at 30° C. (inside temperature) with stirring for 15 hours. Then, the polymerizate was taken out and the polymerization reactor inside was washed with water and observed for polymer scale deposition. The observation results are shown in Table 2.

TABLE 2

| Test Example | | Scale inhibitor solution A: Scale inhibitor | Organic solvent (weight ratio) | B: Silica organosol | C: Alkyl silicate | A:B:C (weight ratio) | Quantity of scale [g/m²] | Peel-abil-ity | State of film |
|---|---|---|---|---|---|---|---|---|---|
| 45 | Comparative | None | — | — | — | — | 304 | E | — |
| 46 | Comparative | None | MeOH | Methanolic | — | 0:100:0 | 313 | E | Peelable |
| 47 | Comparative | None | n-BuOH | n-Butanolic | — | 0:100:0 | 294 | E | Peelable |
| 48 | Comparative | Compound No. 1 | DMF/n-BuOH = 9/1 | — | — | 100:0:0 | 243 | E | Peelable |
| 49 | Comparative | Compound No. 3 | DMF/n-BuOH = 9/1 | — | — | 100:0:0 | 198 | E | Peelable |

TABLE 2-continued

| Test Example | | A: Scale inhibitor | Scale inhibitor solution Organic solvent (weight ratio) | B: Silica organosol | C: Alkyl silicate | A:B:C (weight ratio) | Quantity of scale [g/m$^2$] | Peel-ability | State of film |
|---|---|---|---|---|---|---|---|---|---|
| 50 | Comparative | Compound No. 6 (unreduced form) | DMF/n-BuOH = 9/1 | — | — | 100:0:0 | 0 | A | Not Peelable |
| 51 | Comparative | Compound No. 8 (unreduced form) | DMF/n-BuOH = 9/1 | — | — | 100:0:0 | 0 | A | Not Peelable |
| 52 | Comparative | Compound No. 6 (reduced form) | DMF/n-BuOH = 9/1 | — | — | 100:0:0 | 0 | A | Not Peelable |
| 53 | Comparative | Compound No. 7 (reduced form) | DMF/n-BuOH = 9/1 | — | — | 100:0:0 | 0 | A | Not Peelable |
| 54 | Comparative | Compound No. 10 (reduced form) | DMF/n-BuOH = 9/1 | — | — | 100:0:0 | 2 | E | Not Peelable |
| 55 | Comparative | Compound No. 13 (reduced form) | DMF/n-BuOH = 9/1 | — | — | 100:0:0 | 6 | E | Not Peelable |
| 56 | Invention | Compound No. 6 (unreduced form) | DMF/n-BuOH = 9/1 | n-Butanolic | — | 90:10:0 | 0 | A | Not Peelable |
| 57 | Invention | Compound No. 7 (unreduced form) | DMF/n-BuOH = 9/1 | n-Butanolic | — | 90:10:0 | 0 | A | Not Peelable |
| 58 | Invention | Compound No. 4 (reduced form) | DMF/n-BuOH/morphorine = 8/1/1 | n-Butanolic | — | 90:10:0 | 0 | A | Not Peelable |
| 59 | Invention | Compound No. 6 (reduced form) | DMF/n-BuOH = 9/1 | n-Butanolic | — | 90:10:0 | 0 | A | Not Peelable |
| 60 | Invention | Compound No. 7 (reduced form) | DMF/n-BuOH = 9/1 | n-Butanolic | — | 90:10:0 | 0 | A | Not Peelable |
| 61 | Invention | Compound No. 8 (reduced form) | DMF/n-BuOH = 9/1 | Methanolic | — | 95:5:0 | 0 | A | Not Peelable |
| 62 | Invention | Compound No. 10 (reduced form) | DMF/n-BuOH = 9/1 | Methanolic | — | 33:67:0 | 0 | A | Not Peelable |
| 63 | Invention | Compound No. 13 (reduced form) | DMF/n-BuOH = 9/1 | Methanolic | — | 17:83:0 | 1 | B | Not Peelable |
| 64 | Invention | Compound No. 4 (reduced form) | DMF/n-BuOH/morphorine = 8/1/1 | n-Butanolic | Ethyl silicate | 85:13:2 | 0 | A | Not Peelable |
| 65 | Invention | Compound No. 6 (reduced form) | DMF/n-BuOH = 9/1 | n-Butanolic | Ethyl silicate | 85:13:2 | 0 | A | Not Peelable |
| 66 | Invention | Compound No. 8 (reduced form) | DMF/n-BuOH = 9/1 | n-Butanolic | Methyl silicate | 29:48:23 | 0 | A | Not Peelable |
| 67 | Invention | Compound No. 13 (reduced form) | DMF/n-BuOH = 9/1 | n-Butanolic | Methyl silicate | 29:48:23 | 0 | A | Not Peelable |

Example 3

The inside wall of a 3-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 3 in the organic solvent specified in Table 3 in a total concentration [A+B (as solids)+C] of 1%, then dried in vacuo at 70° C. for 2 hours and washed with water. This polymerization reactor was charged with 800 g of pure water, 20 g of potassium oleate, 2 g of tripotassium phosphate, 0.4 g of Rongalite, 0.02 g of ethylenediaminetetraacetic acid disodium salt, 0.012 g of ferrous sulfate, 400 g of 1,3-butadiene and 0.4 g of p-menthane hydroperoxide. The polymerization was carried out at 30° C. (inside temperature) with stirring for 15 hours. Then, the polymerizate was taken out and the polymerization reactor inside was washed with water and observed for polymer scale deposition. The observation results are shown in Table 3.

TABLE 3

| Test Example | | A: Scale inhibitor | Scale inhibitor solution Organic solvent (weight ratio) | B: Silica organosol | C: Alkyl silicate | A:B:C (weight ratio) | Quantity of scale [g/m$^2$] | Peel-ability | State of film |
|---|---|---|---|---|---|---|---|---|---|
| 68 | Comparative | None | — | — | — | — | 353 | E | — |
| 69 | Comparative | None | MeOH | Methanolic | — | 0:100:0 | 369 | E | Peelable |
| 70 | Comparative | None | n-BuOH | n-Butanolic | — | 0:100:0 | 349 | E | Peelable |
| 71 | Comparative | Compound No. 1 | DMF/n-BuOH = 9/1 | — | — | 100:0:0 | 325 | E | Peelable |
| 72 | Comparative | Compound No. 3 | DMF/n-BuOH = 9/1 | — | — | 100:0:0 | 370 | E | Peelable |
| 73 | Comparative | Compound No. 6 (unreduced form) | DMF/n-BuOH = 9/1 | — | — | 100:0:0 | 20 | E | Not Peelable |
| 74 | Comparative | Compound No. 8 (unreduced form) | DMF/n-BuOH = 9/1 | — | — | 100:0:0 | 23 | E | Not Peelable |
| 75 | Comparative | Compound No. 6 (reduced form) | DMF/n-BuOH = 9/1 | — | — | 100:0:0 | 6 | E | Not Peelable |
| 76 | Comparative | Compound No. 7 (reduced form) | DMF/n-BuOH = 9/1 | — | — | 100:0:0 | 12 | E | Not Peelable |
| 77 | Comparative | Compound No. 10 (reduced form) | DMF/n-BuOH = 9/1 | — | — | 100:0:0 | 16 | E | Not Peelable |

TABLE 3-continued

| Test Example | | Scale inhibitor solution | | B: Silica organosol | C: Alkyl silicate | A:B:C (weight ratio) | Quantity of scale [g/m$^2$] | Peel-ability | State of film |
|---|---|---|---|---|---|---|---|---|---|
| | | A: Scale inhibitor | Organic solvent (weight ratio) | | | | | | |
| 78 | Comparative | Compound No. 13 (reduced form) | DMF/n-BuOH = 9/1 | — | — | 100:0:0 | 19 | E | Not Peelable |
| 79 | Invention | Compound No. 6 (unreduced form) | DMF/n-BuOH = 9/1 | n-Butanolic | — | 90:10:0 | 9 | B | Not Peelable |
| 80 | Invention | Compound No. 7 (unreduced form) | DMF/n-BuOH = 9/1 | n-Butanolic | — | 90:10:0 | 10 | B | Not Peelable |
| 81 | Invention | Compound No. 4 (reduced form) | DMF/n-BuOH/morphorine = 8/1/1 | n-Butanolic | — | 90:10:0 | 3 | B | Not Peelable |
| 82 | Invention | Compound No. 6 (reduced form) | DMF/n-BuOH = 9/1 | n-Butanolic | — | 90:10:0 | 2 | B | Not Peelable |
| 83 | Invention | Compound No. 7 (reduced form) | DMF/n-BuOH = 9/1 | n-Butanolic | — | 90:10:0 | 4 | B | Not Peelable |
| 84 | Invention | Compound No. 8 (reduced form) | DMF/n-BuOH = 9/1 | Methanolic | — | 95:5:0 | 5 | B | Not Peelable |
| 85 | Invention | Compound No. 10 (reduced form) | DMF/n-BuOH = 9/1 | Methanolic | — | 33:67:0 | 14 | B | Not Peelable |
| 86 | Invention | Compound No. 13 (reduced form) | DMF/n-BuOH = 9/1 | Methanolic | — | 17:83:0 | 6 | B | Not Peelable |
| 87 | Invention | Compound No. 4 (reduced form) | DMF/n-BuOH/morphorine = 8/1/1 | n-Butanolic | Ethyl silicate | 85:13:2 | 3 | B | Not Peelable |
| 88 | Invention | Compound No. 6 (reduced form) | DMF/n-BuOH = 9/1 | n-Butanolic | Ethyl silicate | 85:13:2 | 1 | B | Not Peelable |
| 89 | Invention | Compound No. 8 (reduced form) | DMF/n-BuOH = 9/1 | n-Butanolic | Ethyl silicate | 29:48:23 | 6 | B | Not Peelable |
| 90 | Invention | Compound No. 8 (reduced form) | DMF/n-BuOH = 9/1 | n-Butanolic | Methyl silicate | 29:48:23 | 2 | B | Not Peelable |
| 91 | Invention | Compound No. 13 (reduced form) | DMF/n-BuOH = 9/1 | n-Butanolic | Methyl silicate | 29:48:23 | 4 | B | Not Peelable |

Example 4

The inside wall of a 3-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 4 in the organic solvent specified in Table 4 in a total concentration [A+B (as solids)+C] of 1%, then dried in vacuo at 70° C. for 2 hours and washed with water. This polymerization reactor was charged with 800 g of pure water, 20 g of potassium oleate, 2 g of tripotassium phosphate, 0.4 g of Rongalite, 0.02 g of ethylenediaminetetraacetic acid disodium salt, 0.012 g of ferrous sulfate, 200 g of styrene, 200 g of 1,3-butadiene and 0.4 g of p-menthane hydroperoxide. The polymerization was carried out at 30° C. (inside temperature) with stirring for 15 hours. Then, 800 g of pure water and 0.4 g of Rongalite were added, the inside temperature was raised to 60° C., 80 g of potassium sulfate (10% aqueous solution) was added and, while a mixture of 120 g of methyl methacrylate and 0.4 g of cumene hydroperoxide was added in 30-g portions at 30-minute intervals, the polymerization reaction was carried out for 2 hours. Thereafter, 0.8 g of cumene hydroperoxide was added and the polymerization reaction was carried out for an additional hour. Then, the polymerizate was taken out and the polymerization reactor inside was washed with water and observed for polymer scale deposition. The observation results are shown in Table 4.

TABLE 4

| Test Example | | Scale inhibitor solution | | B: Silica organosol | C: Alkyl silicate | A:B:C (weight ratio) | Quantity of scale [g/m$^2$] | Peel-ability | State of film |
|---|---|---|---|---|---|---|---|---|---|
| | | A: Scale inhibitor | Organic solvent (weight ratio) | | | | | | |
| 92 | Comparative | None | — | — | — | — | 345 | E | — |
| 93 | Comparative | None | MeOH | Methanolic | — | 0:100:0 | 350 | E | Peelable |
| 94 | Comparative | None | n-BuOH | n-Butanolic | — | 0:100:0 | 335 | E | Peelable |
| 95 | Comparative | Compound No. 1 | DMF/n-BuOH = 9/1 | — | — | 100:0:0 | 132 | E | Peelable |
| 96 | Comparative | Compound No. 2 | DMF/n-BuOH = 9/1 | — | — | 100:0:0 | 155 | E | Peelable |
| 97 | Comparative | Compound No. 3 | DMF/n-BuOH = 9/1 | — | — | 100:0:0 | 133 | E | Peelable |
| 98 | Comparative | Compound No. 6 (unreduced form) | DMF/n-BuOH = 9/1 | — | — | 100:0:0 | 0 | A | Not Peelable |
| 99 | Comparative | Compound No. 7 (unreduced form) | DMF/n-BuOH = 9/1 | — | — | 100:0:0 | 0 | A | Not Peelable |
| 100 | Comparative | Compound No. 4 (reduced form) | DMF/n-BuOH/morphorine = 8/1/1 | — | — | 100:0:0 | 0 | A | Not Peelable |
| 101 | Comparative | Compound No. 6 (reduced form) | DMF/n-BuOH = 9/1 | — | — | 100:0:0 | 0 | A | Not Peelable |
| 102 | Comparative | Compound No. 7 (reduced form) | DMF/n-BuOH = 9/1 | — | — | 100:0:0 | 0 | A | Not Peelable |
| 103 | Comparative | Compound No. 8 | DMF/n-BuOH = 9/1 | — | — | 100:0:0 | 0 | E | Not |

TABLE 4-continued

| Test Example | | Scale inhibitor solution | | B: Silica organosol | C: Alkyl silicate | A:B:C (weight ratio) | Quantity of scale [g/m²] | Peelability | State of film |
|---|---|---|---|---|---|---|---|---|---|
| | | A: Scale inhibitor | Organic solvent (weight ratio) | | | | | | |
| | ative | (reduced form) | | | | | | | Peelable |
| 104 | Comparative | Compound No. 10 (reduced form) | DMF/n-BuOH = 9/1 | — | — | 100:0:0 | 2 | E | Not Peelable |
| 105 | Comparative | Compound No. 13 (reduced form) | DMF/n-BuOH = 9/1 | — | — | 100:0:0 | 6 | E | Not Peelable |
| 106 | Invention | Compound No. 6 (unreduced form) | DMF/n-BuOH = 9/1 | n-Butanolic | — | 90:10:0 | 0 | A | Not Peelable |
| 107 | Invention | Compound No. 7 (unreduced form) | DMF/n-BuOH = 9/1 | n-Butanolic | — | 90:10:0 | 0 | A | Not Peelable |
| 108 | Invention | Compound No. 8 (unreduced form) | DMF/n-BuOH = 9/1 | n-Butanolic | — | 90:10:0 | 2 | B | Not Peelable |
| 109 | Invention | Compound No. 10 (unreduced form) | DMF/n-BuOH = 9/1 | n-Butanolic | — | 90:10:0 | 4 | B | Not Peelable |
| 110 | Invention | Compound No. 4 (reduced form) | DMF/n-BuOH/morphorine = 8/1/1 | n-Butanolic | — | 90:10:0 | 0 | A | Not Peelable |
| 111 | Invention | Compound No. 6 (reduced form) | DMF/n-BuOH = 9/1 | n-Butanolic | — | 90:10:0 | 0 | A | Not Peelable |
| 112 | Invention | Compound No. 8 (reduced form) | DMF/n-BuOH = 9/1 | n-Butanolic | — | 92:8:0 | 2 | B | Not Peelable |
| 113 | Invention | Compound No. 10 (reduced form) | DMF/n-BuOH = 9/1 | n-Butanolic | — | 50:50:0 | 4 | B | Not Peelable |
| 114 | Invention | Compound No. 13 (reduced form) | DMF/n-BuOH = 9/1 | n-Butanolic | — | 14:86:0 | 6 | B | Not Peelable |
| 115 | Invention | Compound No. 4 (reduced form) | DMF/n-BuOH/morphiline = 8/1/1 | n-Butanolic | — | 33:67:0 | 1 | B | Not Peelable |
| 116 | Invention | Compound No. 6 (reduced form) | DMF/n-BuOH = 9/1 | Methanolic | — | 17:83:0 | 20 | C | Not Peelable |
| 117 | Invention | Compound No. 7 (reduced form) | DMF/n-BuOH = 9/1 | Methanolic | — | 95:5:0 | 5 | B | Not Peelable |
| 118 | Invention | Compound No. 4 (reduced form) | DMF/n-BuOH = 9/1 | n-Butanolic | Ethyl silicate | 85:13:2 | 0 | A | Not Peelable |
| 119 | Invention | Compound No. 6 (reduced form) | DMF/n-BuOH = 9/1 | n-Butanolic | Ethyl silicate | 85:13:2 | 0 | A | Not Peelable |
| 120 | Invention | Compound No. 8 (reduced form) | DMF/n-BuOH = 9/1 | n-Butanolic | Methyl silicate | 29:48:23 | 2 | B | Not Peelable |
| 121 | Invention | Compound No. 10 (reduced form) | DMF/n-BuOH = 9/1 | n-Butanolic | Methyl silicate | 29:48:23 | 6 | B | Not Peelable |

Example 5

The inside wall of a 3-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 5 in the organic solvent specified in Table 5 in a total concentration [A+B (as solids)+C] of 1%, then dried in vacuo at 70° C. for 2 hours and washed with water. This polymerization reactor was charged with 800 g of pure water, 20 g of potassium oleate, 2 g of tripotassium phosphate, 0.4 g of Rongalite, 0.02 g of ethylenediaminetetraacetic acid disodium salt, 0.012 g of ferrous sulfate, 400 g of 1,3-butadiene and 0.4 g of p-menthane hydroperoxide. The polymerization was carried out at 30° C. (inside temperature) with stirring for 15 hours. Then, 800 g of pure water and 0.4 g of Rongalite were added, the inside temperature was raised to 60° C., 80 g of potassium sulfate (10% aqueous solution) was added and, while a mixture of 120 g of methyl methacrylate and 0.4 g of cumene hydroperoxide was added in 30-g portions at 30-minute intervals, the polymerization reaction was carried out for 2 hours. Thereafter, 0.8 g of cumene hydroperoxide was added and the polymerization reaction was carried out for an additional hour. Then, the polymerizate was taken out and the polymerization reactor inside was washed with water and observed for polymer scale deposition. The observation results are shown in Table 5.

TABLE 5

| Test Example | | Scale inhibitor solution | | B: Silica organosol | C: Alkyl silicate | A:B:C (weight ratio) | Quantity of scale [g/m²] | Peelability | State of film |
|---|---|---|---|---|---|---|---|---|---|
| | | A: Scale inhibitor | Organic solvent (weight ratio) | | | | | | |
| 122 | Comparative | None | — | — | — | — | 400 | E | — |
| 123 | Comparative | None | MeOH | Methanolic | — | 0:100:0 | 421 | E | Peelable |
| 124 | Comparative | None | n-BuOH | n-Butanolic | — | 0:100:0 | 363 | E | Peelable |
| 125 | Comparative | Compound No. 1 | DMF/n-BuOH = 9/1 | — | — | 100:0:0 | 379 | E | Peelable |
| 126 | Comparative | Compound No. 2 | DMF/n-BuOH = 9/1 | — | — | 100:0:0 | 313 | E | Peelable |
| 127 | Comparative | Compound No. 3 | DMF/n-BuOH = 9/1 | — | — | 100:0:0 | 313 | E | Peelable |
| 128 | Comparative | Compound No. 6 (unreduced form) | DMF/n-BuOH = 9/1 | — | — | 100:0:0 | 31 | E | Not Peelable |

TABLE 5-continued

| Test Example | | Scale inhibitor solution | | B: Silica organosol | C: Alkyl silicate | A:B:C (weight ratio) | Quantity of scale [g/m²] | Peel-ability | State of film |
|---|---|---|---|---|---|---|---|---|---|
| | | A: Scale inhibitor | Organic solvent (weight ratio) | | | | | | |
| 129 | Comparative | Compound No. 8 (unreduced form) | DMF/n-BuOH = 9/1 | — | — | 100:0:0 | 39 | E | Not Peelable |
| 130 | Comparative | Compound No. 4 (reduced form) | DMF/n-BuOH/morphorine = 8/1/1 | — | — | 100:0:0 | 10 | E | Not Peelable |
| 131 | Comparative | Compound No. 6 (reduced form) | DMF/n-BuOH = 9/1 | — | — | 100:0:0 | 8 | E | Not Peelable |
| 132 | Comparative | Compound No. 7 (reduced form) | DMF/n-BuOH = 9/1 | — | — | 100:0:0 | 18 | E | Not Peelable |
| 133 | Comparative | Compound No. 8 (reduced form) | DMF/n-BuOH = 9/1 | — | — | 100:0:0 | 29 | E | Not Peelable |
| 134 | Comparative | Compound No. 10 (reduced form) | DMF/n-BuOH = 9/1 | — | — | 100:0:0 | 18 | E | Not Peelable |
| 135 | Comparative | Compound No. 13 (reduced form) | DMF/n-BuOH = 9/1 | — | — | 100:0:0 | 26 | E | Not Peelable |
| 136 | Invention | Compound No. 6 (unreduced form) | DMF/n-BuOH = 9/1 | n-Butanolic | — | 90:10:0 | 16 | B | Not Peelable |
| 137 | Invention | Compound No. 7 (unreduced form) | DMF/n-BuOH = 9/1 | n-Butanolic | — | 90:10:0 | 21 | B | Not Peelable |
| 138 | Invention | Compound No. 10 (unreduced form) | DMF/n-BuOH = 9/1 | n-Butanolic | — | 90:10:0 | 19 | B | Not Peelable |
| 139 | Invention | Compound No. 4 (reduced form) | DMF/n-BuOH/morphorine = 8/1/1 | n-Butanolic | — | 90:10:0 | 5 | B | Not Peelable |
| 140 | Invention | Compound No. 6 (reduced form) | DMF/n-BuOH = 9/1 | n-Butanolic | — | 90:10:0 | 3 | B | Not Peelable |
| 141 | Invention | Compound No. 7 (reduced form) | DMF/n-BuOH = 9/1 | n-Butanolic | — | 90:10:0 | 10 | B | Not Peelable |
| 142 | Invention | Compound No. 8 (reduced form) | DMF/n-BuOH = 9/1 | Methanolic | — | 95:5:0 | 13 | B | Not Peelable |
| 143 | Invention | Compound No. 10 (reduced form) | DMF/n-BuOH = 9/1 | Methanolic | — | 33:67:0 | 7 | B | Not Peelable |
| 144 | Invention | Compound No. 13 (reduced form) | DMF/n-BuOH = 9/1 | Methanolic | — | 17:83:0 | 10 | B | Not Peelable |
| 145 | Invention | Compound No. 4 (reduced form) | DMF/n-BuOH/morphiline = 8/1/1 | n-Butanolic | Ethyl silicate | 29:48:23 | 2 | B | Not Peelable |
| 146 | Invention | Compound No. 6 (reduced form) | DMF/n-BuOH = 9/1 | n-Butanolic | Ethyl silicate | 29:48:23 | 0 | A | Not Peelable |
| 147 | Invention | Compound No. 8 (reduced form) | DMF/n-BuOH = 9/1 | n-Butanolic | Ethyl silicate | 85:13:2 | 0 | A | Not Peelable |
| 148 | Invention | Compound No. 8 (reduced form) | DMF/n-BuOH = 9/1 | n-Butanolic | Methyl silicate | 85:13:2 | 2 | B | Not Peelable |
| 149 | Invention | Compound No. 13 (reduced form) | DMF/n-BuOH = 9/1 | n-Butanolic | Methyl silicate | 85:13:2 | 3 | B | Not Peelable |

Example 6

The inside wall of a 8-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 6 in the organic solvent specified in Table 6 in a total concentration [A+B (as solids)+C] of 1%, then dried in vacuo at 70° C. for 2 hours and washed with water. This polymerization reactor was charged with 1,875 g of a polybutadiene latex (solids content 40%), 1,875 g of pure water, 0.075 g of ethylenediaminetetraacetic acid disodium salt, 0.0375 g of ferrous sulfate and 3 g of Rongalite. The contents were heated and, at 60° C., the polymerization reaction was carried out by adding a solution of 4.5 g of cumene hydroperoxide in a mixture of 460 g of methyl methacrylate, 150 g of styrene and 140 g of acrylonitrile continuously over 2 hours. The polymerizate was then taken out and the polymerization reactor inside was washed with water and observed for polymer scale deposition. The observation results are shown in Table 6.

TABLE 6

| Test Example | | Scale inhibitor solution | | B: Silica organosol | C: Alkyl silicate | A:B:C (weight ratio) | Quantity of scale [g/m²] | Peel-ability | State of film |
|---|---|---|---|---|---|---|---|---|---|
| | | A: Scale inhibitor | Organic solvent (weight ratio) | | | | | | |
| 150 | Comparative | None | — | — | — | — | 163 | E | — |
| 151 | Comparative | None | MeOH | Methanolic | — | 0:100:0 | 142 | E | Peelable |
| 152 | Comparative | Compound No. 1 | DMF/n-BuOH = 9/1 | — | — | 100:0:0 | 60 | E | Peelable |
| 153 | Comparative | Compound No. 6 (unreduced form) | DMF/n-BuOH = 9/1 | — | — | 100:0:0 | 3 | E | Not Peelable |
| 154 | Comparative | Compound No. 8 (unreduced form) | DMF/n-BuOH = 9/1 | — | — | 100:0:0 | 15 | E | Not Peelable |
| 155 | Comparative | Compound No. 6 (reduced form) | DMF/n-BuOH = 9/1 | — | — | 100:0:0 | 2 | E | Not Peelable |
| 156 | Comparative | Compound No. 7 | DMF/n-BuOH = 9/1 | — | — | 100:0:0 | 4 | E | Not |

TABLE 6-continued

| Test Example | | Scale inhibitor solution | | B: Silica organosol | C: Alkyl silicate | A:B:C (weight ratio) | Quantity of scale [g/m$^2$] | Peel- abil- ity | State of film |
|---|---|---|---|---|---|---|---|---|---|
| | | A: Scale inhibitor | Organic solvent (weight ratio) | | | | | | |
| 157 | Comparative | ative Compound No. 10 (reduced form) | DMF/n-BuOH = 9/1 | — | — | 100:0:0 | 10 | E | Peelable Not Peelable |
| 158 | Invention | Compound No. 6 (unreduced form) | DMF/n-BuOH = 9/1 | n-Butanolic | — | 90:10:0 | 1 | B | Not Peelable |
| 159 | Invention | Compound No. 7 (unreduced form) | DMF/n-BuOH = 9/1 | n-Butanolic | — | 90:10:0 | 1 | B | Not Peelable |
| 160 | Invention | Compound No. 4 (reduced form) | DMF/n-BuOH/morpholine = 8/1/1 | n-Butanolic | — | 90:10:0 | 0 | A | Not Peelable |
| 161 | Invention | Compound No. 6 (reduced form) | DMF/n-BuOH = 9/1 | n-Butanolic | — | 90:10:0 | 0 | A | Not Peelable |
| 162 | Invention | Compound No. 7 (reduced form) | DMF/n-BuOH = 9/1 | n-Butanolic | — | 90:10:0 | 0 | A | Not Peelable |
| 163 | Invention | Compound No. 8 (reduced form) | DMF/n-BuOH = 9/1 | n-Butanolic | — | 95:5:0 | 2 | B | Not Peelable |
| 164 | Invention | Compound No. 10 (reduced form) | DMF/n-BuOH = 9/1 | n-Butanolic | — | 33:69:0 | 4 | B | Not Peelable |
| 165 | Invention | Compound No. 13 (reduced form) | DMF/n-BuOH = 9/1 | n-Butanolic | — | 17:83:0 | 2 | B | Not Peelable |
| 166 | Invention | Compound No. 6 (reduced form) | DMF/n-BuOH = 9/1 | n-Butanolic | Ethyl silicate | 85:13:2 | 0 | A | Not Peelable |
| 167 | Invention | Compound No. 8 (reduced form) | DMF/n-BuOH = 9/1 | n-Butanolic | Methyl silicate | 29:48:23 | 2 | B | Not Peelable |

Example 7

The inside wall of a 3-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 7 in the organic solvent specified in Table 7 in a total concentration [A+B (as solids)+C] of 1%, then dried in vacuo at 70° C. for 2 hours and washed with water. This polymerization reactor was charged with 1,500 g of pure water, 500 g of acrylonitrile and 500 g of vinyl chloride. Emulsion polymerization was carried out in the presence of 50 g of sodium alkylbenzenesulfonate as surfactant using 300 g of potassium persulfate as polymerization initiator. After completion of the polymerization, the polymerizate was taken out and the polymerization reactor inside was washed with water and observed for polymer scale deposition. The observation results are shown in Table 7.

TABLE 7

| Test Example | | Scale inhibitor solution | | B: Silica organosol | C: Alkyl silicate | A:B:C (weight ratio) | Quantity of scale [g/m$^2$] | Peel- abil- ity | State of film |
|---|---|---|---|---|---|---|---|---|---|
| | | A: Scale inhibitor | Organic solvent (weight ratio) | | | | | | |
| 168 | Comparative | None | — | — | — | — | 363 | E | — |
| 169 | Comparative | None | MeOH | Methanolic | — | 0:100:0 | 352 | E | Peelable |
| 170 | Comparative | Compound No. 1 | DMF/n-BuOH = 9/1 | — | — | 100:0:0 | 280 | E | Peelable |
| 171 | Comparative | Compound No. 6 (unreduced form) | DMF/n-BuOH = 9/1 | — | — | 100:0:0 | 82 | E | Not Peelable |
| 172 | Comparative | Compound No. 8 (unreduced form) | DMF/n-BuOH = 9/1 | — | — | 100:0:0 | 103 | E | Not Peelable |
| 173 | Comparative | Compound No. 6 (reduced form) | DMF/n-BuOH = 9/1 | — | — | 100:0:0 | 70 | E | Not Peelable |
| 174 | Comparative | Compound No. 7 (reduced form) | DMF/n-BuOH = 9/1 | — | — | 100:0:0 | 85 | E | Not Peelable |
| 175 | Comparative | Compound No. 8 (reduced form) | DMF/n-BuOH = 9/1 | — | — | 100:0:0 | 93 | E | Not Peelable |
| 176 | Invention | Compound No. 6 (unreduced form) | DMF/n-BuOH = 9/1 | n-Butanolic | — | 90:10:0 | 2 | B | Not Peelable |
| 177 | Invention | Compound No. 7 (unreduced form) | DMF/n-BuOH = 9/1 | n-Butanolic | — | 90:10:0 | 5 | B | Not Peelable |
| 178 | Invention | Compound No. 4 (reduced form) | DMF/n-BuOH/morpholine = 8/1/1 | n-Butanolic | — | 90:10:0 | 8 | B | Not Peelable |
| 179 | Invention | Compound No. 6 (reduced form) | DMF/n-BuOH = 9/1 | n-Butanolic | — | 90:10:0 | 1 | B | Not Peelable |
| 180 | Invention | Compound No. 7 (reduced form) | DMF/n-BuOH = 9/1 | n-Butanolic | — | 90:10:0 | 2 | B | Not Peelable |
| 181 | Invention | Compound No. 8 (reduced form) | DMF/n-BuOH = 9/1 | n-Butanolic | — | 95:5:0 | 4 | B | Not Peelable |
| 182 | Invention | Compound No. 10 (reduced form) | DMF/n-BuOH = 9/1 | n-Butanolic | — | 33:67:0 | 10 | B | Not Peelable |
| 183 | Invention | Compound No. 13 (reduced form) | DMF/n-BuOH = 9/1 | n-Butanolic | — | 17:83:0 | 4 | B | Not Peelable |
| 184 | Invention | Compound No. 6 (reduced form) | DMF/n-BuOH/morpholine = 8/1/1 | n-Butanolic | Ethyl silicate | 85:13:2 | 1 | B | Not Peelable |

TABLE 7-continued

| Test Example | | Scale inhibitor solution | | B: Silica organosol | C: Alkyl silicate | A:B:C (weight ratio) | Quantity of scale [g/m$^2$] | Peel-ability | State of film |
|---|---|---|---|---|---|---|---|---|---|
| | | A: Scale inhibitor | Organic solvent (weight ratio) | | | | | | |
| 185 | Invention | Compound No. 8 (reduced form) | DMF/n-BuOH = 9/1 | n-Butanolic | Ethyl silicate | 29:48:23 | 1 | B | Not Peelable |

Example 8

The inside wall of a 3-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 8 in the organic solvent specified in Table 8 in a total concentration [A+B (as solids)+C] of 1%, then dried in vacuo at 70° C. for 2 hours and washed with water. This polymerization reactor was charged with 1,500 g of pure water and 1.0 kg of vinyl chloride monomer and the suspension polymerization of the vinyl chloride was carried out using 40 g of polyvinyl alcohol as dispersing agent and 300 g of lauroyl peroxide as polymerization initiator. After completion of the polymerization, the polymerizate was taken out and the polymerization reactor inside was washed with water and observed for polymer scale deposition. The observation results are shown in Table 8.

Example 9

The inside wall of a 4-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 9 in the organic solvent specified in Table 9 in a total concentration [A+B (as solids)+C] of 1%, then dried in vacuo at 70° C. for 2 hours and washed with water. This polymerization reactor was charged with 1,000 g of pure water and 1,000 g of vinyl chloride monomer and the emulsion polymerization of the vinyl chloride was carried out in the presence of a redox catalyst system consisting of hydrogen peroxide and sodium sulfite using 50 g of sodium lauryl sulfate as surfactant. After completion of the polymerization, the polymerizate was taken out and the polymerization reactor inside was washed with water and observed for polymer scale deposition. The observation results are shown in Table 9.

TABLE 8

| Test Example | | Scale inhibitor solution | | B: Silica organosol | C: Alkyl silicate | A:B:C (weight ratio) | Quantity of scale [g/m$^2$] | Peel-ability | State of film |
|---|---|---|---|---|---|---|---|---|---|
| | | A: Scale inhibitor | Organic solvent (weight ratio) | | | | | | |
| 186 | Comparative | None | — | — | — | — | 326 | E | — |
| 187 | Comparative | Compound No. 6 (unreduced form) | DMF/n-BuOH = 9/1 | — | — | 100:0:0 | 3 | B | Not Peelable |
| 188 | Comparative | Compound No. 6 (reduced form) | DMF/n-BuOH = 9/1 | — | — | 100:0:0 | 3 | B | Not Peelable |
| 189 | Comparative | Compound No. 7 (reduced form) | DMF/n-BuOH = 9/1 | — | — | 100:0:0 | 5 | B | Not Peelable |
| 190 | Invention | Compound No. 6 (unreduced form) | DMF/n-BuOH = 9/1 | n-Butanolic | — | 90:10:0 | 0 | A | Not Peelable |
| 191 | Invention | Compound No. 7 (unreduced form) | DMF/n-BuOH = 9/1 | n-Butanolic | — | 33:67:0 | 0 | A | Not Peelable |
| 192 | Invention | Compound No. 6 (reduced form) | DMF/n-BuOH = 9/1 | n-Butanolic | — | 90:10:0 | 0 | A | Not Peelable |
| 193 | Invention | Compound No. 7 (reduced form) | DMF/n-BuOH = 9/1 | n-Butanolic | — | 95:5:0 | 0 | A | Not Peelable |
| 194 | Invention | Compound No. 8 (reduced form) | DMF/n-BuOH = 9/1 | n-Butanolic | Ethyl silicate | 85:13:2 | 0 | A | Not Peelable |

TABLE 9

| Test Example | | Scale inhibitor solution | | B: Silica organosol | C: Alkyl silicate | A:B:C (weight ratio) | Quantity of scale [g/m$^2$] | Peel-ability | State of film |
|---|---|---|---|---|---|---|---|---|---|
| | | A: Scale inhibitor | Organic solvent (weight ratio) | | | | | | |
| 195 | Comparative | None | — | — | — | — | 240 | E | — |
| 196 | Comparative | Compound No. 6 (unreduced form) | DMF/n-BuOH = 9/1 | — | — | 100:0:0 | 4 | B | Not Peelable |
| 197 | Comparative | Compound No. 6 (reduced form) | DMF/n-BuOH = 9/1 | — | — | 100:0:0 | 2 | B | Not Peelable |
| 198 | Comparative | Compound No. 7 (reduced form) | DMF/n-BuOH = 9/1 | — | — | 100:0:0 | 5 | B | Not Peelable |
| 199 | Invention | Compound No. 6 (unreduced form) | DMF/n-BuOH = 9/1 | n-Butanolic | — | 90:10:0 | 0 | A | Not Peelable |
| 200 | Invention | Compound No. 7 (unreduced form) | DMF/n-BuOH = 9/1 | n-Butanolic | — | 33:67:0 | 0 | A | Not Peelable |
| 201 | Invention | Compound No. 6 (reduced form) | DMF/n-BuOH = 9/1 | n-Butanolic | — | 90:10:0 | 0 | A | Not Peelable |
| 202 | Invention | Compound No. 7 (reduced form) | DMF/n-BuOH = 9/1 | n-Butanolic | — | 95:5:0 | 0 | A | Not Peelable |

TABLE 9-continued

| Test Example | Scale inhibitor solution | | B: Silica organosol | C: Alkyl silicate | A:B:C (weight ratio) | Quantity of scale [g/m$^2$] | Peel-ability | State of film |
|---|---|---|---|---|---|---|---|---|
| | A: Scale inhibitor | Organic solvent (weight ratio) | | | | | | |
| 203 | Invention | Compound No. 8 (reduced form) | DMF/n-BuOH = 9/1 | n-Butanolic | Ethyl silicate | 85:13:2 | 0 | A | Not Peelable |

Example 10

The inside wall of a 15-liter stainless steel polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 10 in the organic solvent specified in Table 10 in a total concentration [A+B (as solids)+C] of 1%, then dried in vacuo at 70° C. for 2 hours and washed with water. This polymerization reactor was charged with 7,000 g of pure water, 70 g of sodium dodecylbenzenesulfonate, 7 g of potassium persulfate, 2,800 g of methyl methacrylate and 700 g of styrene and the polymerization was carried out at 70° C. (inside temperature) for 8 hours. Then, the polymerizate was taken out and the polymerization reactor inside was washed with water and observed for polymer scale deposition. The observation results are shown in Table 10.

Example 11

The inside wall of a 3-liter glass-lined polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 11 in the organic solvent specified in Table 11 in a total concentration [A+B (as solids)+C] of 1%, then dried in vacuo at 70° C. for 2 hours and washed with water. This polymerization reactor was charged with 1,300 g of pure water, 501 g of methyl methacrylate, 56 g of ethyl acrylate, 8.4 g of sodium dioctyl sulfosuccinate as emulsifier and 1.11 g of potassium persulfate as catalyst. The polymerization was carried out at 50° C. (inside temperature) with stirring for 6 hours. Then, the polymerizate was taken out and the polymerization reactor inside was washed with water and observed for polymer scale deposition. The observation results are shown in Table 11.

TABLE 10

| Test Example | Scale inhibitor solution | | B: Silica organosol | C: Alkyl silicate | A:B:C (weight ratio) | Quantity of scale [g/m$^2$] | Peel-ability | State of film |
|---|---|---|---|---|---|---|---|---|
| | A: Scale inhibitor | Organic solvent (weight ratio) | | | | | | |
| 204 | Comparative | None | — | — | — | — | 230 | E | — |
| 205 | Comparative | None | MeOH | Methanolic | — | 0:100:0 | 220 | E | Peelable |
| 206 | Comparative | None | n-BuOH | n-Butanolic | — | 0:100:0 | 180 | E | Peelable |
| 207 | Comparative | Compound No. 2 | DMF/n-BuOH = 9/1 | — | — | 100:0:0 | 138 | E | Peelable |
| 208 | Comparative | Compound No. 6 (unreduced form) | DMF/n-BuOH = 9/1 | — | — | 100:0:0 | 12 | E | Not Peelable |
| 209 | Comparative | Compound No. 6 (reduced form) | DMF/n-BuOH = 9/1 | — | — | 100:0:0 | 10 | E | Not Peelable |
| 210 | Comparative | Compound No. 7 (reduced form) | DMF/n-BuOH = 9/1 | — | — | 100:0:0 | 8 | E | Not Peelable |
| 211 | Comparative | Compound No. 8 (reduced form) | DMF/n-BuOH = 9/1 | — | — | 100:0:0 | 6 | E | Not Peelable |
| 212 | Invention | Compound No. 6 (unreduced form) | DMF/n-BuOH = 9/1 | n-Butanolic | — | 90:10:0 | 2 | B | Not Peelable |
| 213 | Invention | Compound No. 7 (unreduced form) | DMF/n-BuOH = 9/1 | n-Butanolic | — | 90:10:0 | 1 | B | Not Peelable |
| 214 | Invention | Compound No. 4 (reduced form) | DMF/n-BuOH/morphorine = 8/1/1 | n-Butanolic | — | 90:10:0 | 0 | A | Not Peelable |
| 215 | Invention | Compound No. 6 (reduced form) | DMF/n-BuOH = 9/1 | n-Butanolic | — | 95:5:0 | 1 | B | Not Peelable |
| 216 | Invention | Compound No. 7 (reduced form) | DMF/n-BuOH = 9/1 | n-Butanolic | — | 95:5:0 | 0 | A | Not Peelable |
| 217 | Invention | Compound No. 8 (reduced form) | DMF/n-BuOH = 9/1 | n-Butanolic | Methyl silicate | 85:13:2 | 0 | A | Not Peelable |

TABLE 11

| Test Example | Scale inhibitor solution | | B: Silica organosol | C: Alkyl silicate | A:B:C (weight ratio) | Quantity of scale [g/m$^2$] | Peel-ability | State of film |
|---|---|---|---|---|---|---|---|---|
| | A: Scale inhibitor | Organic solvent (weight ratio) | | | | | | |
| 218 | Comparative | None | — | — | — | — | 830 | E | — |
| 219 | Comparative | None | n-BuOH | n-Butanolic | Ethyl silicate | — | 1200 | E | Peelable |
| 220 | Comparative | Potassium anthraquinonedisulfonate | MeOH | — | — | 100:0:0 | 925 | E | Peelable |
| 221 | Comparative | Compound No. 1 | DMF/n-BuOH = 9/1 | — | — | 100:0:0 | 836 | E | Peelable |

TABLE 11-continued

| Test Example | | Scale inhibitor solution | | B: Silica organosol | C: Alkyl silicate | A:B:C (weight ratio) | Quantity of scale [g/m²] | Peelability | State of film |
|---|---|---|---|---|---|---|---|---|---|
| | | A: Scale inhibitor | Organic solvent (weight ratio) | | | | | | |
| 222 | Comparative | Compound No. 3 | DMF/n-BuOH = 9/1 | — | — | 100:0:0 | 1005 | E | Peelable |
| 223 | Comparative | Compound No. 4 (unreduced form) | DMF/n-BuOH/morpholine = 8/1/1 | — | — | 100:0:0 | 936 | E | Peelable |
| 224 | Comparative | Compound No. 6 (unreduced form) | DMF/n-BuOH = 9/1 | — | — | 100:0:0 | 520 | E | Peelable |
| 225 | Comparative | Compound No. 4 (reduced form) | DMF/n-BuOH = 9/1 | n-Butanolic | — | 90:10:0 | 736 | E | Peelable |
| 226 | Comparative | Compound No. 6 (reduced form) | DMF/n-BuOH = 9/1 | n-Butanolic | — | 90:10:0 | 460 | E | Peelable |
| 227 | Comparative | Potassium anthraquinonedisulfonate | MeOH | n-Butanolic | Ethyl silicate | 85:13:2 | 436 | C | Peelable |
| 228 | Comparative | p-Aminodiphenylamine | MeOH | n-Butanolic | Ethyl silicate | 85:13:2 | 628 | C | Peelable |
| 229 | Comparative | Compound No. 1 (unreduced form) | DMF/n-BuOH = 9/1 | n-Butanolic | Ethyl silicate | 85:13:2 | 431 | C | Peelable |
| 230 | Comparative | Compound No. 3 (unreduced form) | DMF/n-BuOH = 9/1 | n-Butanolic | Ethyl silicate | 85:13:2 | 400 | C | Peelable |
| 231 | Invention | Compound No. 4 (unreduced form) | DMF/n-BuOH = 9/1 | n-Butanolic | Ethyl silicate | 85:13:2 | 6 | B | Not Peelable |
| 232 | Invention | Compound No. 6 (unreduced form) | DMF/n-BuOH = 9/1 | n-Butanolic | Ethyl silicate | 85:13:2 | 8 | B | Not Peelable |
| 233 | Invention | Compound No. 7 (unreduced form) | DMF/n-BuOH = 9/1 | n-Butanolic | Ethyl silicate | 85:13:2 | 8 | B | Not Peelable |
| 234 | Invention | Compound No. 4 (reduced form) | DMF/n-BuOH/morphorine = 8/1/1 | n-Butanolic | Ethyl silicate | 85:13:2 | 0 | A | Not Peelable |
| 235 | Invention | Compound No. 6 (reduced form) | DMF/n-BuOH = 9/1 | n-Butanolic | Ethyl silicate | 85:13:2 | 0 | A | Not Peelable |
| 236 | Invention | Compound No. 7 (reduced form) | DMF/n-BuOH = 9/1 | n-Butanolic | Ethyl silicate | 85:13:2 | 0 | A | Not Peelable |
| 237 | Invention | Compound No. 8 (reduced form) | DMF/n-BuOH = 9/1 | n-Butanolic | Ethyl silicate | 85:13:2 | 5 | B | Not Peelable |
| 238 | Invention | Compound No. 10 (reduced form) | DMF/n-BuOH/morpholine = 8/1/1 | n-Butanolic | Ethyl silicate | 85:13:2 | 8 | B | Not Peelable |
| 239 | Invention | Compound No. 13 (reduced form) | DMF/n-BuOH = 9/1 | n-Butanolic | Ethyl silicate | 85:13:2 | 2 | B | Not Peelable |
| 240 | Invention | Compound No. 6 (reduced form) | DMF/n-BuOH/morpholine = 8/1/1 | n-Butanolic | Ethyl silicate | 29:48:23 | 3 | B | Not Peelable |
| 241 | Invention | Compound No. 6 (reduced form) | DMF/n-BuOH = 9/1 | n-Butanolic | Ethyl silicate | 14:72:14 | 23 | B | Not Peelable |
| 242 | Invention | Compound No. 6 (reduced form) | DMF/n-BuOH = 9/1 | n-Butanolic | Methyl silicate | 85:13:2 | 0 | B | Not Peelable |
| 243 | Invention | Compound No. 7 (reduced form) | DMF/n-BuOH/morpholine = 8/1/1 | n-Butanolic | Butyl silicate | 85:13:2 | 1 | B | Not Peelable |
| 244 | Comparative | None | MeOH | Methanolic | Silane coupling agent[*1] | 85:13:2 | 863 | E | Not Peelable |
| 245 | Comparative | None | MeOH | Methanolic | Silane coupling agent[*2] | 21:42:37 | 923 | E | Not Peelable |
| 246 | Comparative | None | MeOH | Methanolic | Silane coupling agent[*3] | 19:38:43 | 1120 | E | Not Peelable |
| 247 | Comparative | Compound No. 6 (reduced form) | DMF/n-BuOH = 9/1 | Methanolic | Silane coupling agent[*1] | 77:8:15 | 1023 | E | Not Peelable |
| 248 | Comparative | Compound No. 6 (reduced form) | DMF/n-BuOH = 9/1 | Methanolic | Silane coupling agent[*4] | 88:9:3 | 936 | E | Not Peelable |
| 249 | Comparative | Compound No. 6 (reduced form) | DMF/n-BuOH = 9/1 | Methanolic | Polyvinylidene fluoride | 88:9:3 | 736 | E | Not Peelable |

[*1] γ-Ureidopropyltriethoxysilane.
[*2] After application of the methanolic silica sol and the subsequent drying at 80° C. (20 minutes), γ-(2-aminoethyl)aminopropyltrimethoxysilane was applied, followed by drying at 80° C. for 2 hours.
[*3] Ethylmethoxysilane was applied in the same manner as mentioned above under [*2].
[*4] γ-Methacryloxypropyltrimethoxysilane.

Example 12

The inside wall of a 3-liter glass-lined polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 12 in the organic solvent specified in Table 12 in a total concentration [A+B (as solids)+C] of 1%, then dried in vacuo at 70° C. for 2 hours and washed with water. This polymerization reactor was charged with 800 g of pure water, 20 g of potassium oleate, 2 g of tripotassium phosphate, 0.4 g of Rongalite, 0.02 g of ethylenediaminetetraacetic acid disodium salt, 0.012 g of ferrous sulfate, 120 g of styrene, 280 g of 1,3-butadiene and 0.4 g of p-menthane hydroperoxide. The polymerization was carried out at 30° C. (inside temperature) with stirring for 15 hours. Then, the polymerizate was taken out and the polymerization reactor inside was washed with water and observed for polymer scale deposition. The observation results are shown in Table 12.

TABLE 12

| Test Example | | A: Scale inhibitor | Organic solvent (weight ratio) | B: Silica organosol | C: Alkyl silicate | A:B:C (weight ratio) | Quantity of scale [g/m²] | Peelability | State of film |
|---|---|---|---|---|---|---|---|---|---|
| 250 | Comparative | None | — | — | — | — | 351 | E | — |
| 251 | Comparative | None | n-BuOH | n-Butanolic | Ethyl silicate | 0:83:17 | 371 | C | Not Peelable |
| 252 | Comparative | Compound No. 1 | DMF/n-BuOH = 9/1 | — | — | 100:0:0 | 301 | E | Peelable |
| 253 | Comparative | Compound No. 2 | DMF/n-BuOH = 9/1 | — | — | 100:0:0 | 278 | E | Peelable |
| 254 | Comparative | Compound No. 4 (unreduced form) | DMF/n-BuOH/morpholine = 8/1/1 | — | — | 100:0:0 | 198 | E | Peelable |
| 255 | Comparative | Compound No. 6 (unreduced form) | DMF/n-BuOH = 9/1 | — | — | 100:0:0 | 235 | E | Peelable |
| 256 | Comparative | Compound No. 6 (reduced form) | DMF/n-BuOH = 9/1 | Methanaolic | — | 90:10:0 | 288 | C | Peelable |
| 257 | Comparative | Compound No. 13 (reduced form) | DMF/n-BuOH = 9/1 | n-Butanolic | — | 33:67:0 | 323 | C | Peelable |
| 258 | Comparative | Compound No. 1 | DMF/n-BuOH = 9/1 | n-Butanolic | Ethyl silicate | 85:13:2 | 132 | C | Peelable |
| 259 | Comparative | Compound No. 3 | DMF/n-BuOH = 9/1 | n-Butanolic | Ethyl silicate | 85:13:2 | 103 | C | Peelable |
| 260 | Invention | Compound No. 6 (unreduced form) | DMF/n-BuOH = 9/1 | n-Butanolic | Methyl silicate | 85:13:2 | 3 | B | Not Peelable |
| 261 | Invention | Compound No. 8 (unreduced form) | DMF/n-BuOH = 9/1 | n-Butanolic | Methyl silicate | 85:13:2 | 10 | B | Not Peelable |
| 262 | Invention | Compound No. 4 (reduced form) | DMF/n-BuOH/9/1 | n-Butanolic | Ethyl silicate | 85:13:2 | 1 | B | Not Peelable |
| 263 | Invention | Compound No. 6 (reduced form) | DMF/n-BuOH = 9/1 | n-Butanolic | Ethyl silicate | 85:13:2 | 0 | A | Not Peelable |
| 264 | Invention | Compound No. 7 (reduced form) | DMF/n-BuOH = 9/1 | n-Butanolic | Ethyl silicate | 85:13:2 | 2 | B | Not Peelable |
| 265 | Invention | Compound No. 8 (reduced form) | DMF/n-BuOH = 9/1 | n-Butanolic | Ethyl silicate | 85:13:2 | 0 | A | Not Peelable |
| 266 | Invention | Compound No. 10 (reduced form) | DMF/n-BuOH = 9/1 | n-Butanolic | Ethyl silicate | 85:13:2 | 9 | B | Not Peelable |
| 267 | Invention | Compound No. 13 (reduced form) | DMF/n-BuOH = 9/1 | n-Butanolic | Ethyl silicate | 85:13:2 | 14 | B | Not Peelable |
| 268 | Invention | Compound No. 6 (reduced form) | DMF/n-BuOH = 9/1 | n-Butanolic | Ethyl silicate | 78:11:11 | 6 | B | Not Peelable |
| 269 | Invention | Compound No. 6 (reduced form) | DMF/n-BuOH = 9/1 | n-Butanolic | Ethyl silicate | 18:41:41 | 7 | B | Not Peelable |
| 270 | Comparative | None | MeOH | Methanolic | Silane coupling agent*1 | 0:62:38 | 382 | E | Not Peelable |
| 271 | Comparative | None | MeOH | Methanolic | Silane coupling agent*2 | 0:50:50 | 392 | E | Not Peelable |
| 272 | Comparative | Compound No. 6 (reduced form) | DMF/n-BuOH = 9/1 | Methanolic | Silane coupling agent*3 | 38:38:27 | 402 | E | Not Peelable |
| 273 | Comparative | Compound No. 6 (reduced form) | DMF/n-BuOH = 9/1 | Methanolic | Silane coupling agent*1 | 55:28:17 | 377 | E | Not Peelable |
| 274 | Comparative | Compound No. 6 (reduced form) | DMF/n-BuOH = 9/1 | Methanolic | Silane coupling agent*4 | 25:50:25 | 359 | E | Not Peelable |
| 275 | Comparative | Compound No. 6 (reduced form) | DMF/n-BuOH = 9/1 | Methanolic | Polyvinylidene fluoride | 25:50:25 | 388 | E | Not Peelable |

*1, *2, *3, *4 See Notes to Table 11.

Example 13

The inside wall of a 3-liter glass-lined polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 13 in the organic solvent specified in Table 13 in a total concentration [A+B (as solids)+C] of 1%, then dried in vacuo at 70° C. for 2 hours and washed with water. This polymerization reactor was charged with 800 g of pure water, 20 g of potassium oleate, 2 g of tripotassium phosphate, 0.4 g of Rongalite, 0.02 g of ethylenediaminetetraacetic acid disodium salt, 0.012 g of ferrous sulfate, 400 g of 1,3-butadiene and 0.4 g of p-menthane hydroperoxide. The polymerization was carried out at 30° C. (inside temperature) with stirring for 15 hours. Then, the polymerizate was taken out and the polymerization reactor inside was washed with water and observed for polymer scale deposition. The observation results are shown in Table 13.

TABLE 13

| Test Example | | A: Scale inhibitor | Organic solvent (weight ratio) | B: Silica organosol | C: Alkyl silicate | A:B:C (weight ratio) | Quantity of scale [g/m²] | Peelability | State of film |
|---|---|---|---|---|---|---|---|---|---|
| 276 | Comparative | None | — | — | — | — | 421 | E | — |
| 277 | Comparative | None | n-BuOH | n-Butanolic | Ethyl silicate | 0:83:17 | 471 | E | Not Peelable |

TABLE 13-continued

| Test Example | | Scale inhibitor solution A: Scale inhibitor | Organic solvent (weight ratio) | B: Silica organosol | C: Alkyl silicate | A:B:C (weight ratio) | Quantity of scale [g/m²] | Peel-ability | State of film |
|---|---|---|---|---|---|---|---|---|---|
| 278 | Comparative | Compound No. 1 | DMF/n-BuOH = 9/1 | — | — | 100:0:0 | 392 | E | Peelable |
| 279 | Comparative | Compound No. 2 | DMF/n-BuOH = 9/1 | — | — | 100:0:0 | 361 | E | Peelable |
| 280 | Comparative | Compound No. 4 (unreduced form) | DMF/n-BuOH/morpholine = 8/1/1 | — | — | 100:0:0 | 271 | E | Peelable |
| 281 | Comparative | Compound No. 6 (unreduced form) | DMF/n-BuOH = 9/1 | — | — | 100:0:0 | 221 | E | Peelable |
| 282 | Comparative | Compound No. 6 (reduced form) | DMF/n-BuOH = 9/1 | Methanaolic | — | 90:10:0 | 203 | E | Peelable |
| 283 | Comparative | Compound No. 13 (reduced form) | DMF/n-BuOH = 9/1 | n-Butanolic | — | 33:67:0 | 241 | E | Peelable |
| 284 | Comparative | Compound No. 1 | DMF/n-BuOH = 9/1 | n-Butanolic | Ethyl silicate | 85:13:2 | 181 | C | Peelable |
| 285 | Comparative | Compound No. 3 | DMF/n-BuOH = 9/1 | n-Butanolic | Ethyl silicate | 85:13:2 | 142 | C | Peelable |
| 286 | Invention | Compound No. 6 (unreduced form) | DMF/n-BuOH = 9/1 | n-Butanolic | Methyl silicate | 85:13:2 | 14 | B | Not Peelable |
| 287 | Invention | Compound No. 8 (unreduced form) | DMF/n-BuOH = 9/1 | n-Butanolic | Methyl silicate | 85:13:2 | 17 | B | Not Peelable |
| 288 | Invention | Compound No. 4 (reduced form) | DMF/n-BuOH = 9/1 | n-Butanolic | Ethyl silicate | 85:13:2 | 9 | B | Not Peelable |
| 289 | Invention | Compond No. 6 (reduced form) | DMF/n-BuOH = 9/1 | n-Butanolic | Ethyl silicate | 85:13:2 | 0 | A | Not Peelable |
| 290 | Invention | Compound No. 7 (reduced form) | DMF/n-BuOH = 9/1 | n-Butanolic | Ethyl silicate | 85:13:2 | 11 | B | Not Peelable |
| 291 | Invention | Compound No. 8 (reduced form) | DMF/n-BuOH = 9/1 | n-Butanolic | Ethyl silicate | 85:13:2 | 0 | A | Not Peelable |
| 292 | Invention | Compound No. 10 (reduced form) | DMF/n-BuOH = 9/1 | n-Butanolic | Ethyl silicate | 85:13:2 | 17 | B | Not Peelable |
| 293 | Invention | Compound No. 13 (reduced form) | DMF/n-BuOH = 9/1 | n-Butanolic | Ethyl silicate | 85:13:2 | 42 | B | Not Peelable |
| 294 | Invention | Compound No. 6 (reduced form) | DMF/n-BuOH = 9/1 | n-Butanolic | Ethyl silicate | 24:38:38 | 13 | B | Not Peelable |
| 295 | Invention | Compound No. 6 (reduced form) | DMF/n-BuOH = 9/1 | n-Butanolic | Ethyl silicate | 20:40:40 | 19 | B | ·Not Peelable |
| 296 | Comparactive | None | MeOH | Methanolic | Silane coupling agent[*1] | 0:50:50 | 398 | E | Not Peelable |
| 297 | Comparactive | None | MeOH | Methanolic | Silane coupling agent[*2] | 0:90:10 | 256 | E | Not Peelable |
| 298 | Comparative | Compound No. 6 (reduced form) | DMF/n-BuOH = 9/1 | Methanolic | Silane coupling agent[*3] | 85:13:2 | 203 | E | Not Peelable |
| 299 | Comparative | Compound No. 6 (reduced form) | DMF/n-BuOH = 9/1 | Methanolic | Silane coupling agent[*1] | 81:16:3 | 241 | E | Not Peelable |
| 300 | Comparative | Compound No. 6 (reduced form) | DMF/n-BuOH = 9/1 | Methanolic | Silane coupling agent[*4] | 33:33:34 | 391 | E | Not Peelable |
| 301 | Comparative | Compound No. 6 (reduced form) | DMF/n-BuOH = 9/1 | Methanolic | Polyvinylidene fluoride | 90:0:10 | 443 | E | Not Peelable |

[*1], [*2], [*3], [*4] See Notes to Table 11.

Example 14

The inside wall of a 14-liter glass-lined polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 14 in the organic solvent specified in Table 14 in a total concentration [A+B (as solids)+C] of 1%, then dried in vacuo at 70° C. for 2 hours and washed with water. This polymerization reactor was charged with 1,150 g of a styrene-butadiene copolymer latex (solids content 30%), 650 g of pure water, 0.3 g of Rongalite, 0.02 g of ethylenediaminetetraacetic acid disodium salt and 0.01 g of ferrous sulfate. The inside temperature was raised to 60° C., 150 g of 5% aqueous potassium sulfate solution was added and then, while a solution of 0.4 ml of cumene hydroperoxide in 150 ml of methyl methacrylate was added in 50-ml portions at 30-minute intervals, the polymerization was carried out for 1.5 hours. Then, 0.8 ml of cumene hydroperoxide was added and the polymerization was performed for an additional hour. Thereafter, the polymerizate was taken out and the polymerization reactor inside was washed with water and observed for polymer scale deposition. The observation results are shown in Table 14.

TABLE 14

| Test Example | | Scale inhibitor solution A: Scale inhibitor | Organic solvent (weight ratio) | B: Silica organosol | C: Alkyl silicate | A:B:C (weight ratio) | Quantity of scale [g/m²] | Peel-ability | State of film |
|---|---|---|---|---|---|---|---|---|---|
| 302 | Comparative | None | — | — | — | — | 320 | E | — |
| 303 | Comparative | None | n-BuOH | n-Butanolic | Ethyl silicate | 0:83:17 | 380 | C | Not Peelable |

TABLE 14-continued

| Test Example | | Scale inhibitor solution | | B: Silica organosol | C: Alkyl silicate | A:B:C (weight ratio) | Quantity of scale [g/m$^2$] | Peelability | State of film |
|---|---|---|---|---|---|---|---|---|---|
| | | A: Scale inhibitor | Organic solvent (weight ratio) | | | | | | |
| 304 | Comparative | Compound No. 1 | DMF/n-BuOH = 9/1 | — | — | 100:0:0 | 170 | E | Peelable |
| 305 | Comparative | Compound No. 4 (unreduced form) | DMF/n-BuOH/morpholine = 8/1/1 | — | — | 100:0:0 | 136 | E | Peelable |
| 306 | Comparative | Compound No. 6 (unreduced form) | DMF/n-BuOH = 9/1 | — | — | 100:0:0 | 122 | E | Peelable |
| 307 | Comparative | Compound No. 6 (reduced form) | DMF/n-BuOH = 9/1 | Methanaolic | — | 90:10:0 | 90 | E | Peelable |
| 308 | Comparative | Compound No. 13 (reduced form) | DMF/n-BuOH = 9/1 | n-Butanolic | — | 33:67:0 | 94 | E | Peelable |
| 309 | Comparative | Compound No. 1 | DMF/n-BuOH = 9/1 | n-Butanolic | Ethyl silicate | 81:16:3 | 136 | E | Peelable |
| 310 | Invention | Compound No. 6 (unreduced form) | DMF/n-BuOH = 9/1 | n-Butanolic | Ethyl silicate | 85:13:2 | 2 | B | Not Peelable |
| 311 | Invention | Compound No. 4 (reduced form) | DMF/n-BuOH = 9/1 | n-Butanolic | Ethyl silicate | 85:13:2 | 2 | B | Not Peelable |
| 312 | Invention | Compound No. 6 (reduced form) | DMF/n-BuOH = 9/1 | n-Butanolic | Ethyl silicate | 85:13:2 | 2 | B | Not Peelable |
| 313 | Invention | Compound No. 7 (reduced form) | DMF/n-BuOH = 9/1 | n-Butanolic | Ethyl silicate | 85:13:2 | 3 | B | Not Peelable |
| 314 | Invention | Compound No. 8 (reduced form) | DMF/n-BuOH = 9/1 | n-Butanolic | Ethyl silicate | 85:13:2 | 8 | B | Not Peelable |
| 315 | Invention | Compound No. 10 (reduced form) | DMF/n-BuOH = 9/1 | n-Butanolic | Ethyl silicate | 85:13:2 | 4 | B | Not Peelable |
| 316 | Invention | Compound No. 13 (reduced form) | DMF/n-BuOH = 9/1 | n-Butanolic | Ethyl silicate | 85:13:2 | 13 | B | Not Peelable |
| 317 | Invention | Compound No. 6 (reduced form) | DMF/n-BuOH = 9/1 | n-Butanolic | Ethyl silicate | 85:13:2 | 10 | B | Not Peelable |
| 318 | Invention | Compound No. 6 (reduced form) | DMF/n-BuOH = 9/1 | n-Butanolic | Ethyl silicate | 85:13:2 | 14 | B | Not Peelable |
| 319 | Comparative | None | MeOH | Methanolic | Silane coupling agent*[1] | 0:50:50 | 321 | E | Not Peelable |
| 320 | Comparative | None | MeOH | Methanolic | Silane coupling agent*[2] | 0:50:50 | 304 | E | Not Peelable |
| 321 | Comparative | Compound No. 6 (reduced form) | DMF/n-BuOH = 9/1 | Methanolic | Silane coupling agent*[3] | 85:13:2 | 241 | E | Not Peelable |
| 322 | Comparative | Compound No. 6 (reduced form) | DMF/n-BuOH = 9/1 | Methanolic | Silane coupling agent*[1] | 24:38:38 | 136 | E | Not Peelable |
| 323 | Comparative | Compound No. 6 (reduced form) | DMF/n-BuOH = 9/1 | Methanolic | Silane coupling agent*[4] | 24:38:38 | 103 | E | Not Peelable |
| 324 | Comparative | Compound No. 6 (reduced form) | DMF/n-BuOH = 9/1 | Methanolic | Polyvinylidene fluoride | 24:38:38 | 121 | E | Not Peelable |

*[1], *[2], *[3], *[4] See Notes to Table 11.

Example 15

The inside wall of a 3-liter glass-lined polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 15 in the organic solvent specified in Table 15 in a total concentration [A+B (as solids)+C] of 1%, then dried in vacuo at 70° C. for 2 hours and washed with water. This polymerization reactor was charged with 800 g of pure water, 20 g of potassium oleate, 2 g of tripotassium phosphate, 0.4 g of Rongalite, 0.02 g of ethylenediaminetetraacetic acid disodium salt, 0.012 g of ferrous sulfate, 400 g of 1,3-butadiene and 0.4 g of p-menthane hydroperoxide. The polymerization was carried out at 30° C. (inside temperature) with stirring for 15 hours. Then, 800 g of pure water and 0.4 g of Rongalite were added, the inside temperature was raised to 60° C., 80 g of potassium sulfate (10% aqueous solution) was added and, while a mixture of 120 g of methyl methacrylate and 0.4 g of cumene hydroperoxide was added in 30-g portions at 30-minute intervals, the polymerization reaction was carried out for 2 hours. Thereafter, 0.8 g of cumene hydroperoxide was added and the polymerization reaction was carried out for an additional hour. Then, the polymerizate was taken out and the polymerization reactor inside was washed with water and observed for polymer scale deposition. The observation results are shown in Table 15.

TABLE 15

| Test Example | | Scale inhibitor solution | | B: Silica organosol | C: Alkyl silicate | A:B:C (weight ratio) | Quantity of scale [g/m$^2$] | Peelability | State of film |
|---|---|---|---|---|---|---|---|---|---|
| | | A: Scale inhibitor | Organic solvent (weight ratio) | | | | | | |
| 325 | Comparative | None | — | — | — | — | 483 | E | — |
| 326 | Comparative | None | n-BuOH | n-Butanolic | Ethyl silicate | 0:83:17 | 436 | C | Not Peelable |
| 327 | Comparative | Compound No. 1 | DMF/n-BuOH = 9/1 | — | — | 100:0:0 | 425 | E | Peelable |
| 328 | Comparative | Compound No. 4 (unreduced form) | DMF/n-BuOH/morpholine = 8/1/1 | — | — | 100:0:0 | 251 | E | Peelable |

TABLE 15-continued

| Test Example | | Scale inhibitor solution | | B: Silica organosol | C: Alkyl silicate | A:B:C (weight ratio) | Quantity of scale [g/m$^2$] | Peel- abil- ity | State of film |
|---|---|---|---|---|---|---|---|---|---|
| | | A: Scale inhibitor | Organic solvent (weight ratio) | | | | | | |
| 329 | Comparative | Compound No. 6 (unreduced form) | DMF/n-BuOH = 9/1 | — | — | 100:0:0 | 193 | E | Peelable |
| 330 | Comparative | Compound No. 6 (reduced form) | DMF/n-BuOH = 9/1 | Methanaolic | — | 90:10:0 | 210 | E | Peelable |
| 331 | Comparative | Compound No. 13 (reduced form) | DMF/n-BuOH = 9/1 | n-Butanolic | — | 33:67:0 | 211 | E | Peelable |
| 332 | Comparative | Compound No. 1 | DMF/n-BuOH = 9/1 | n-Butanolic | Ethyl silicate | 85:13:2 | 186 | C | Peelable |
| 333 | Invention | Compound No. 6 (unreduced form) | DMF/n-BuOH = 9/1 | n-Butanolic | Ethyl silicate | 85:13:2 | 16 | B | Not Peelable |
| 334 | Invention | Compound No. 4 (reduced form) | DMF/n-BuOH = 9/1 | n-Butanolic | Ethyl silicate | 85:13:2 | 7 | B | Not Peelable |
| 335 | Invention | Compound No. 6 (reduced form) | DMF/n-BuOH = 9/1 | n-Butanolic | Ethyl silicate | 85:13:2 | 5 | B | Not Peelable |
| 336 | Invention | Compound No. 7 (reduced form) | DMF/n-BuOH = 9/1 | n-Butanolic | Ethyl silicate | 85:13:2 | 15 | B | Not Peelable |
| 337 | Invention | Compound No. 8 (reduced form) | DMF/n-BuOH = 9/1 | n-Butanolic | Ethyl silicate | 85:13:2 | 19 | B | Not Peelable |
| 338 | Invention | Compound No. 10 (reduced form) | DMF/n-BuOH = 9/1 | n-Butanolic | Ethyl silicate | 85:13:2 | 29 | B | Not Peelable |
| 339 | Invention | Compound No. 13 (reduced form) | DMF/n-BuOH = 9/1 | n-Butanolic | Ethyl silicate | 85:13:2 | 63 | B | Not Peelable |
| 340 | Invention | Compound No. 6 (reduced form) | DMF/n-BuOH = 9/1 | n-Butanolic | Ethyl silicate | 24:38:38 | 7 | B | Not Peelable |
| 341 | Invention | Compound No. 6 (reduced form) | DMF/n-BuOH = 9/1 | n-Butanolic | Ethyl silicate | 19:38:43 | 0 | B | Not Peelable |
| 342 | Comparative | None | MeOH | Methanolic | Silane coupling agent*[1] | 0:50:50 | 363 | E | Not Peelable |
| 343 | Comparative | None | MeOH | Methanolic | Silane coupling agent*[2] | 0:90:10 | 420 | E | Not Peelable |
| 344 | Comparative | Compound No. 6 (reduced form) | DMF/n-BuOH = 9/1 | Methanolic | Silane coupling agent*[3] | 85:13:2 | 435 | E | Not Peelable |
| 345 | Comparative | Compound No. 6 (reduced form) | DMF/n-BuOH = 9/1 | Methanolic | Silane coupling agent*[1] | 85:13:2 | 391 | E | Not Peelable |
| 346 | Comparative | Compound No. 6 (reduced form) | DMF/n-BuOH = 9/1 | Methanolic | Silane coupling agent*[4] | 85:13:2 | 236 | E | Not Peelable |
| 347 | Comparative | Compound No. 6 (reduced form) | DMF/n-BuOH = 9/1 | Methanolic | Polyvinylidene fluoride | 85:13:2 | 413 | E | Not Peelable |

*[1], *[2], *[3], *[4] See Notes to Table 11.

Example 16

The inside wall of a 8-liter glass-lined polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 16 in the organic solvent specified in Table 16 in a total concentration [A+B (as solids)+C] of 1%, then dried in vacuo at 70° C. for 2 hours and washed with water. This polymerization reactor was charged with 1,875 g of a polybutadiene latex (solids content 40%), 1,875 g of pure water, 0.075 g of ethylenediaminetetraacetic acid disodium salt, 0.0375 g of ferrous sulfate and 3 g of Rongalite. The contents were heated and, at 60° C., the polymerization reaction was carried out by adding a solution of 4.5 g of cumene hydroperoxide in a mixture of 460 g of methyl methacrylate, 150 g of styrene and 140 g of acrylonitrile continuously over 2 hours. The polymerizate was then taken out and the polymerization reactor inside was washed with water and observed for polymer scale deposition. The observation results are shown in Table 16.

TABLE 16

| Test Example | | Scale inhibitor solution | | B: Silica organosol | C: Alkyl silicate | A:B:C (weight ratio) | Quantity of scale [g/m$^2$] | Peel- abil- ity | State of film |
|---|---|---|---|---|---|---|---|---|---|
| | | A: Scale inhibitor | Organic solvent (weight ratio) | | | | | | |
| 348 | Comparative | None | — | — | — | — | 236 | E | — |
| 349 | Comparative | None | n-BuOH | n-Butanolic | Ethyl silicate | 0:83:17 | 283 | C | Not Peelable |
| 350 | Comparative | Compound No. 1 | DMF/n-BuOH = 9/1 | — | — | 100:0:0 | 223 | E | Peelable |
| 351 | Comparative | Compound No. 6 (unreduced form) | DMF/n-BuOH = 9/1 | — | — | 100:0:0 | 63 | E | Peelable |
| 352 | Comparative | Compound No. 6 (reduced form) | DMF/n-BuOH = 9/1 | Methanolic | — | 90:10:0 | 43 | E | Peelable |
| 353 | Comparative | Compound No. 1 | DMF/n-BuOH = 9/1 | Methanolic | Ethyl silicate | 85:13:2 | 40 | C | Peelable |
| 354 | Invention | Compound No. 6 (unreduced form) | DMF/n-BuOH = 9/1 | Methanolic | Ethyl silicate | 85:13:2 | 8 | B | Not Peelable |
| 355 | Invention | Compound No. 4 (reduced form) | DMF/n-BuOH = 9/1 | Methanolic | Ethyl silicate | 85:13:2 | 3 | B | Not Peelable |

TABLE 16-continued

| Test Example | | Scale inhibitor solution | | B: Silica organosol | C: Alkyl silicate | A:B:C (weight ratio) | Quantity of scale [g/m$^2$] | Peelability | State of film |
|---|---|---|---|---|---|---|---|---|---|
| | | A: Scale inhibitor | Organic solvent (weight ratio) | | | | | | |
| 356 | Invention | Compound No. 6 (reduced form) | DMF/n-BuOH = 9/1 | Methanolic | Ethyl silicate | 85:13:2 | 3 | B | Not Peelable |
| 357 | Invention | Compound No. 7 (reduced form) | DMF/n-BuOH = 9/1 | Methanolic | Ethyl silicate | 85:13:2 | 4 | B | Not Peelable |
| 358 | Invention | Compound No. 8 (reduced form) | DMF/n-BuOH = 9/1 | Methanolic | Ethyl silicate | 85:13:2 | 9 | B | Not Peelable |
| 359 | Invention | Compound No. 10 (reduced form) | DMF/n-BuOH = 9/1 | Methanolic | Ethyl silicate | 85:13:2 | 10 | B | Not Peelable |
| 360 | Invention | Compound No. 13 (reduced form) | DMF/n-BuOH = 9/1 | Methanolic | Ethyl silicate | 85:13:2 | 5 | B | Not Peelable |
| 361 | Comparative | None | MeOH | Methanolic | Silane coupling agent*$^1$ | 0:50:50 | 392 | E | Not Peelable |
| 362 | Comparative | None | MeOH | Methanolic | Silane coupling agent*$^2$ | 0:70:30 | 293 | E | Not Peelable |
| 363 | Comparative | Compound No. 6 (reduced form) | DMF/n-BuOH = 9/1 | Methanolic | Silane coupling agent*$^3$ | 85:13:2 | 194 | E | Not Peelable |
| 364 | Comparative | Compound No. 6 (reduced form) | DMF/n-BuOH = 9/1 | Methanolic | Silane coupling agent*$^4$ | 85:13:2 | 204 | E | Not Peelable |
| 365 | Comparative | Compound No. 6 (reduced form) | DMF/n-BuOH = 9/1 | Methanolic | Polyvinylidene fluoride | 85:13:2 | 205 | E | Not Peelable |

*$^1$, *$^2$, *$^3$, *$^4$ See Notes to Table 11.

Example 17

The inside wall of a 3-liter glass-lined polymerization reactor equipped with an agitator, the stirring blades of said agitator, the baffle-plates and other surfaces were coated with a coating composition prepared by dissolving the components A (scale inhibitor, namely quinone-amine compound), B (silica organosol) and C (alkyl silicate) specified in Table 17 in the organic solvent specified in Table 17 in a total concentration [A+B (as solids)+C] of 1%, then dried in vacuo at 70° C. for 2 hours and washed with water. This polymerization reactor was charged with 1,500 g of pure water, 500 g of acrylonitrile and 500 g of vinyl chloride. Emulsion polymerization was carried out in the presence of 50 g of sodium alkylbenzenesulfonate as surfactant using 300 g of potassium persulfate as polymerization initiator. After completion of the polymerization, the polymerizate was taken out and the polymerization reactor inside was washed with water and observed for polymer scale deposition. The observation results are shown in Table 17.

TABLE 17

| Test Example | | Scale inhibitor solution | | B: Silica organosol | C: Alkyl silicate | A:B:C (weight ratio) | Quantity of scale [g/m$^2$] | Peelability | State of film |
|---|---|---|---|---|---|---|---|---|---|
| | | A: Scale inhibitor | Organic solvent (weight ratio) | | | | | | |
| 366 | Comparative | None | — | — | — | — | 431 | E | — |
| 367 | Comparative | None | n-BuOH | n-Butanolic | Ethyl silicate | 0:83:17 | 451 | E | Not Peelable |
| 368 | Comparative | Compound No. 1 | DMF/n-BuOH = 9/1 | — | — | 100:0:0 | 391 | E | Not Peelable |
| 369 | Comparative | Compound No. 6 (unreduced form) | DMF/n-BuOH = 9/1 | — | — | 100:0:0 | 290 | E | Not Peelable |
| 370 | Comparative | Compound No. 6 (reduced form) | DMF/n-BuOH = 9/1 | Methanaolic | — | 90:10:0 | 230 | E | Not Peelable |
| 371 | Comparative | Compound No. 1 | DMF/n-BuOH = 9/1 | Methanolic | Ethyl silicate | 85:13:2 | 290 | C | Not Peelable |
| 372 | Invention | Compound No. 6 (unreduced form) | DMF/n-BuOH = 9/1 | Methanolic | Ethyl silicate | 85:13:2 | 8 | B | Not Peelable |
| 373 | Invention | Compound No. 4 (reduced form) | DMF/n-BuOH = 9/1 | Methanolic | Ethyl silicate | 85:13:2 | 10 | B | Not Peelable |
| 374 | Invention | Compound No. 6 (reduced form) | DMF/n-BuOH = 9/1 | Methanolic | Ethyl silicate | 85:13:2 | 4 | B | Not Peelable |
| 375 | Invention | Compound No. 7 (reduced form) | DMF/n-BuOH = 9/1 | Methanolic | Ethyl silicate | 85:13:2 | 6 | B | Not Peelable |
| 376 | Invention | Compound No. 8 (reduced form) | DMF/n-BuOH = 9/1 | Methanolic | Ethyl silicate | 85:13:2 | 8 | B | Not Peelable |
| 377 | Invention | Compound No. 10 (reduced form) | DMF/n-BuOH = 9/1 | Methanolic | Ethyl silicate | 85:13:2 | 17 | B | Not Peelable |
| 378 | Invention | Compound No. 13 (reduced form) | DMF/n-BuOH = 9/1 | Methanolic | Ethyl silicate | 85:13:2 | 8 | B | Not Peelable |
| 379 | Comparative | None | MeOH | Methanolic | Silane coupling agent*$^1$ | 0:70:30 | 321 | E | Not Peelable |
| 380 | Comparative | None | MeOH | Methanolic | Silane coupling agent*$^2$ | 0:45:55 | 293 | E | Not Peelable |
| 381 | Comparative | Compound No. 6 (reduced form) | DMF/n-BuOH = 9/1 | Methanolic | Silane coupling agent*$^3$ | 85:13:2 | 209 | E | Not Peelable |
| 382 | Comparative | Compound No. 6 (reduced form) | DMF/n-BuOH = 9/1 | Methanolic | Silane coupling agent*$^4$ | 85:13:2 | 198 | E | Not Peelable |
| 383 | Comparative | Compound No. 6 | DMF/n-BuOH = 9/1 | Methanolic | Polyvinylidene | 85:13:2 | 311 | E | Not |

TABLE 17-continued

| Test Example | Scale inhibitor solution | | B: Silica organosol | C: Alkyl silicate | A:B:C (weight ratio) | Quantity of scale [g/m$^2$] | Peelability | State of film |
|---|---|---|---|---|---|---|---|---|
| | A: Scale inhibitor | Organic solvent (weight ratio) | | | | | | |
| ative | (reduced form) | | | fluoride | | | | Peelable |

*1, *2, *3, *4 See Notes to Table 11.

What is claimed is:

1. A method of preventing polymer scale deposition in a reactor in which is conducted the polymerization of only one or more monomers each having an ethylenic double bond which comprises coating surfaces inside said reactor in advance with a coating composition comprising a quinone-amine compound having an average molecular weight of at least 3,000 as obtained by subjecting at least one aromatic diamine and at least one aromatic quinone to addition reaction in at least one solvent having a solubility parameter of 8.5 to 24.0 and/or a reduced form of said quinone-amine compound and at least one silica organosol to thereby form a hydrophilic coat film on said surfaces, said aromatic diamine being selected from the group consisting of p-phenylenediamine, o-phenylenediamine, m-phenylenediamine, 1,4-diaminonephthalene, 1,8-diaminonaphthalene, diaminoacridine, diaminopyridine, diaminopyridine, diaminofluorene, diaminoazobenzene, diaminobenzidine, diaminodiphenylamine, diaminotoluene, and those derivatives of these which have, on the ring structure thereof, at least one substituent selected from the group consisting of an alkyl group, an aryl group, an alkoxy group, a halogen atom, a hydroxyl group, a mercapto group and a nitro group; and said aromatic quinone being selected from the group consisting of p-benzoquinone, o-benzoquinone, α-naphthoquinone, β-naphthoquinone, phenanthraquinone, and those derivatives of these which have, on the ring structure thereof, at least one substituent selected from the group consisting of a chlorine atom, a bromine atom, a methyl group, an amino group, an alkoxy group and a hydroxyl group.

2. A method as claimed in claim 1, wherein said quinone-amine compound has an average molecular weight of at least 7,000.

3. A method as claimed in claim 1, wherein said solvent is selected from the group consisting of tetrahydrofuran, dimethylformamide, dimethylacetamide, acetonitrile, acetone, methyl ethyl ketone, diethyl ketone, methyl isobutyl ketone, methyl n-butyl ketone, methyl n-propyl ketone, dioxane, methanol, ethanol, acetic acid, pyridine, toluene, benzene, xylene, propanol, chlorobenzene, chloroform, ethyl acetate, n-butyl alcohol, dimethyl sulfoxide and water.

4. A method as claimed in claim 1, wherein said reduced-form quinone-amine compound is obtained by treating said quinone-amine compound with a reducing agent selected from the group consisting of hydrogen, sodium sulfite, sodium hydrogen sulfite, potassium hydrogen sulfite, sodium sulfide, sodium polysulfide, ammonium sulfide; an alkali metal, magnesium, calcium, aluminum, zinc and amalgams of these; salts of iron (II), tin (II), titanium (III) and chromium (II); an aldehyde, formic acid and oxalic acid.

5. A method as claimed in claim 1, wherein said silica organosol is selected from the group consisting of methanolic silica sol, ethanolic silica sol, butanolic silica sol, iso-butanolic silica sol, tert-butanolic silica sol, isopropanolic silica sol, n-propanolic silica sol, n-heptanolic silica sol, n-octanolic silica sol, silica sol in n-pentane, silica sol in n-hexane, silica sol in DMF, silica sol in morpholine, silica sol in toluene and silica sol in xylene.

6. A method of preventing polymer scale deposition in a reactor in which is conducted the polymerization of only one or more monomers each having an ethylenic double bond which comprises coating surfaces inside said reactor in advance with a coating composition comprising a quinone-amine compound having an average molecular weight of at least 3,000 as obtained by subjecting at least one aromatic diamine and at least one aromatic quinone to addition reaction in at least one solvent having a solubility parameter of 8.5 to 24.0 and/or a reduced form of said quinone-amine compound, and a mixture of at least one silica organosol and at least one alkyl silicate, to thereby form a hydrophilic coat film on said surfaces, said aromatic diamine being selected from the group consisting of p-phenylenediamine, o-phenylenediamine, m-phenylenediamine, 1,4-diaminonaphthalene, 1,8-diaminonaphthalene, diaminoacridine, diaminopyridine, diaminopyrimidine, diaminofluorene, diaminoazobenzene, diaminobenzidine, diaminodiphenylamine, diaminotoluene, and those derivatives of these which have, on the ring structure thereof, at least one substituent selected from the group consisting of an alkyl group, an aryl group, an alkoxy group, a halogen atom, a hydroxyl group, a mercapto group and a nitro group, and said aromatic quinone being selected from the group consisting of p-benzoquinone, o-benzoquinone, α-naphthoquinone, β-naphthoquinone, phenanthraquinone, and those derivatives of these which have, on the ring structure thereof, at least one substituent selected from the group consisting of a chlorine atom, a bromine atom, a methyl group, an amino group, an alkoxy group and a hydroxyl group.

7. A method as claimed in claim 6, wherein said quinone-amine compound has an average molecular weight of at least 7,000.

8. A method as claimed in claim 6, wherein said solvent is selected from the group consisting of tetrahydrofuran, dimethylformamide, dimethylacetamide, acetonitrile, acetone, methyl ethyl ketone, diethyl ketone, methyl isobutyl ketone, methyl n-butyl ketone, methyl n-propyl ketone, dioxane, methanol, ethanol, acetic acid, pyridine, toluene, benzene, xylene, propanol, chlorobenzene, chloroform, ethyl acetate, n-butyl alcohol, dimethyl sulfoxide and water.

9. A method as claimed in claim 6, wherein said reduced-form quinone-amine compound is obtained by treating said quinone-amine compound with a reducing agent selected from the group consisting of hydrogen, sodium sulfite, sodium hydrogen sulfite, potassium hydrogen sulfite, sodium sulfide, sodium polysulfide, ammonium sulfide; an alkali metal, magnesium, calcium, aluminum, zinc and amalgams of these; salts of iron (II), tin (II), titanium (III) and chromium (II); an aldehyde, formic acid and oxalic acid.

10. A method as claimed in claim 6, wherein said silica organosol is selected from the group consisting of methanolic silica sol, ethanolic silica sol, butanolic silica sol, iso-butanolic silica sol, tert-butanolic silica sol, iso-propanolic silica sol, n-propanolic silica sol, n-heptanolic silica sol, n-octanolic silica sol, silica sol in n-pentane, silica sol in n-hexane, silica sol in DMF, silica sol in morpholine, silica sol in toluene and silica sol in xylene.

11. A method as claimed in claim 6, wherein said alkyl silicate is selected from the group consisting of methyl silicate, ethyl silicate and butyl silicate.

* * * * *